US010717193B2

(12) United States Patent
Noh et al.

(10) Patent No.: US 10,717,193 B2
(45) Date of Patent: Jul. 21, 2020

(54) ARTIFICIAL INTELLIGENCE MOVING ROBOT AND CONTROL METHOD THEREOF

(71) Applicant: LG ELECTRONICS INC., Seoul (KR)

(72) Inventors: Dongki Noh, Seoul (KR); Hoyoung Lee, Seoul (KR); Seungmin Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 16/002,242

(22) Filed: Jun. 7, 2018

(65) Prior Publication Data

US 2018/0354132 A1 Dec. 13, 2018

(30) Foreign Application Priority Data

Jun. 9, 2017 (KR) .......................... 10-2017-0072746

(51) Int. Cl.
*B25J 9/16* (2006.01)
*G05D 1/02* (2020.01)
(Continued)

(52) U.S. Cl.
CPC ........... *B25J 9/1666* (2013.01); *A47L 9/2826* (2013.01); *A47L 9/2852* (2013.01); *B25J 9/1676* (2013.01);
(Continued)

(58) Field of Classification Search
CPC .... B25J 9/1666; B25J 11/0085; B25J 9/1697; B25J 9/1676; Y10S 901/09; Y10S 901/01;
(Continued)

(56) References Cited

U.S. PATENT DOCUMENTS 7,187,998 B2 * 3/2007 Okamoto ................. B25J 5/007
318/568.12
2006/0111811 A1 * 5/2006 Okamoto ................. B25J 5/007
700/214
(Continued)

FOREIGN PATENT DOCUMENTS

JP 2016219124 * 11/2016 ............... G05D 1/02
JP 2018075191 A * 5/2018 ............... G05D 1/02

*Primary Examiner* — Jaime Figueroa
(74) *Attorney, Agent, or Firm* — KED & Associates, LLP

(57) ABSTRACT

Disclosed is an artificial intelligence moving robot including: a travel unit configured to move a main body based on a navigation map including a plurality of local maps; an image acquisition unit configured to acquire a plurality of images in regions corresponding to the plurality of local maps during movement; a storage unit configured to store the plurality of images acquired by the image acquisition unit; and a controller configured to recognize an attribute of a local map in which an N number of images photographed in multiple directions is acquired among the plurality of local maps, store the attribute recognition result in the storage, generate a semantic map composed of a predetermined number of neighboring local maps, and recognize a final attribute of a region corresponding to the semantic map based on attribute recognition results of the local maps included in the semantic map.

20 Claims, 26 Drawing Sheets

(51) Int. Cl.
    *A47L 9/28*      (2006.01)
    *B25J 11/00*     (2006.01)
(52) U.S. Cl.
    CPC ......... *B25J 9/1697* (2013.01); *B25J 11/0085*
           (2013.01); *G05D 1/0221* (2013.01); *G05D*
           *1/0246* (2013.01); *G05D 1/0274* (2013.01);
           *A47L 2201/04* (2013.01); *G05D 2201/0215*
               (2013.01); *Y10S 901/01* (2013.01); *Y10S*
                                      *901/09* (2013.01)
(58) Field of Classification Search
    CPC .. A47L 9/2852; A47L 9/2826; A47L 2201/04;
                  G05D 1/0274; G05D 1/0246; G05D
                              1/0221; G05D 2201/0215
    USPC .................................................. 700/245, 255
    See application file for complete search history.

(56) References Cited

U.S. PATENT DOCUMENTS

| | | | | |
|---|---|---|---|---|
| 2012/0019627 | A1* | 1/2012 | Choi | A47L 9/009 |
| | | | | 348/50 |
| 2014/0207282 | A1* | 7/2014 | Angle | G05B 15/02 |
| | | | | 700/257 |
| 2017/0312916 | A1* | 11/2017 | Williams | G01C 21/20 |
| 2017/0329347 | A1* | 11/2017 | Passot | A47L 11/4011 |
| 2018/0299899 | A1* | 10/2018 | Suvarna | H04W 24/08 |
| 2018/0364045 | A1* | 12/2018 | Williams | G05D 1/0274 |
| 2019/0254490 | A1* | 8/2019 | Marutani | A47L 5/10 |

\* cited by examiner

FIG. 6
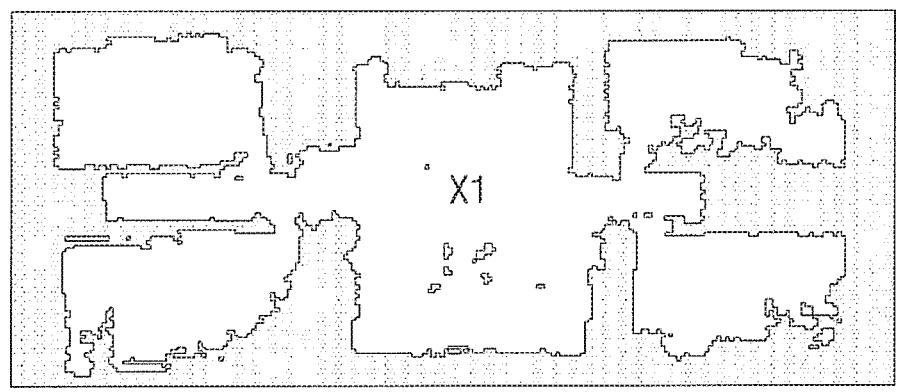
(a)
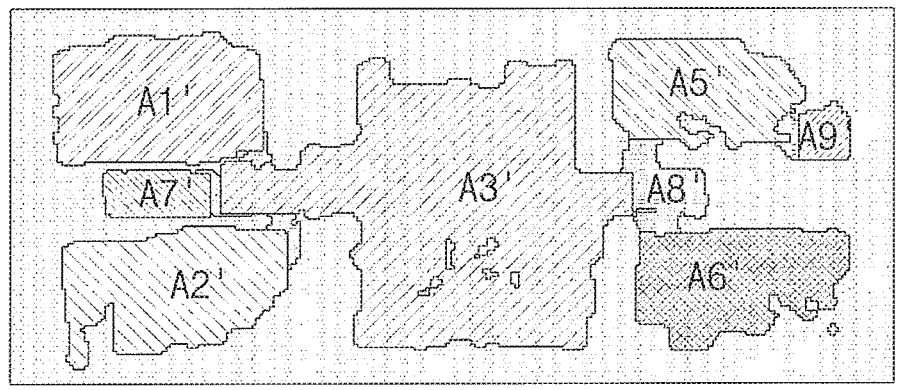
(b)
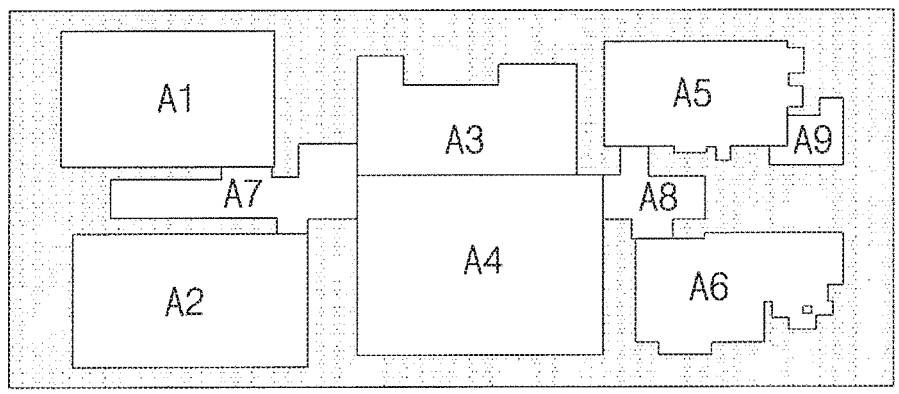
(c)

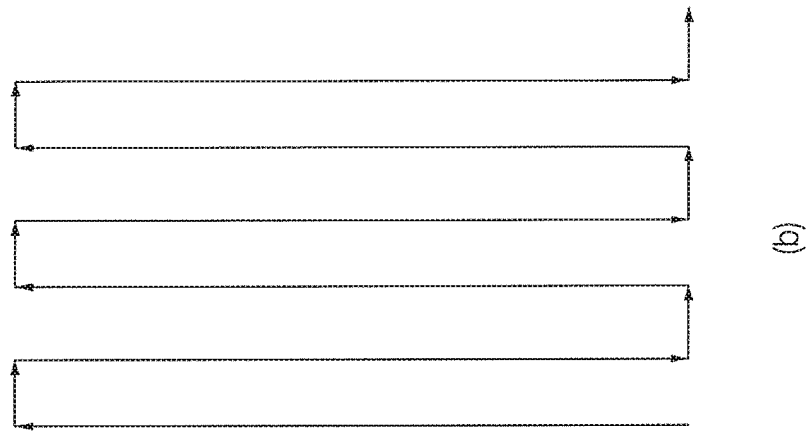
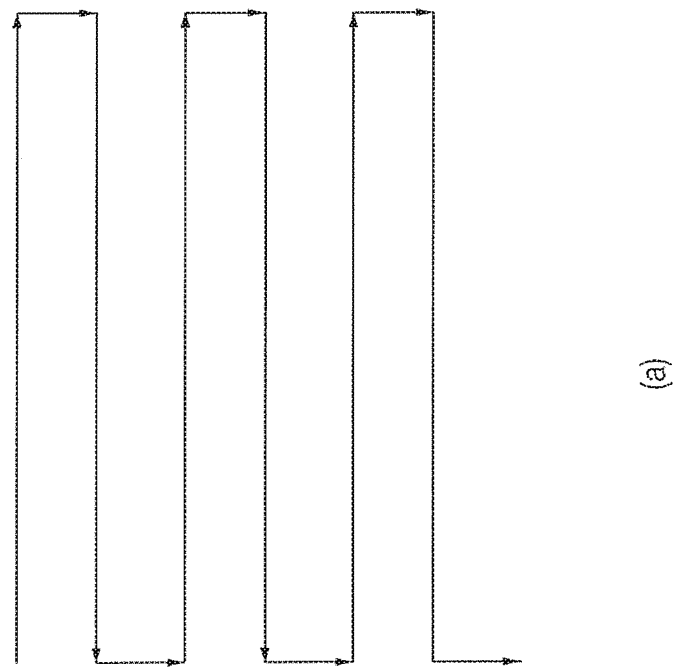
FIG. 18

| X COORDINATE OF ROBOT | Y COORDINATE OF ROBOT | DIRECTION | LINE | OCCUPANCY | LOCAL MAP | IMAGE |
|---|---|---|---|---|---|---|

(b)

| Rx1 | Ry1 | 0 | 1 | True | 1 | IMAGE |
|---|---|---|---|---|---|---|

(c)

| Rx4 | Ry4 | 0 | 1 | True | 4 | IMAGE |
|---|---|---|---|---|---|---|

FIG. 23

RECOGNITION RESULT (Local Map1) = {E:BED ROOM, 0.9 , W:BED ROOM, 0.7 , S:BED ROOM, 0.7 , M:BED ROOM, 0.9}

RECOGNITION RESULT (Local Map2) = {E:BED ROOM, 0.8 , W:BED ROOM, 0.6 , S:BED ROOM, 0.5 , M:BED ROOM, 0.9}

RECOGNITION RESULT (Local Map3) = {E:BED ROOM, 0.7 , W:BED ROOM, 0.5 , S:BED ROOM, 0.4 , M:BED ROOM, 0.8}

ARTIFICIAL INTELLIGENCE MOVING ROBOT AND CONTROL METHOD THEREOF

CROSS-REFERENCE TO RELATED APPLICATION

This application claims priority under 35 U.S.C. § 119 to Korean Application No. 10-2017-0072746 filed on Jun. 9, 2017, whose entire disclosure is hereby incorporated by reference.

BACKGROUND

1. Field

The present disclosure relates to a moving robot and a control method thereof, and, more particularly, to a moving robot capable of recognizing attributes of regions in a map and a control method thereof.

2. Background

Robots were developed for industrial use and prompted automation of production operations. Recently, they are being used more widely, for example, in the medical industry and the aerospace industry. There are even domestic robots used for household chores. Among such robots, a type of robot capable of traveling on it own is called a moving robot. A typical example of the moving robot used at home is a robot cleaner which travels on its own in a particular region to perform cleaning by suctioning dusts or foreign substances.

An existing moving robot performs cleaning by moving with reference to the current location, without segmenting regions. If there is an obstacle existing in the forward direction of travel, the moving robot keeps moving by converting the direction. As a result, the moving robot may clean the same region repeatedly or may fail to return to its original location.

For this reason, the moving robot is controlled to perform a particular region using a pre-stored map, and prevented to clean the same region repeatedly. However, when generating a map, the moving robot simply extracts an outline of a travel area while moving by executing wall following. Thus, it is necessary to segment a plurality of rooms connecting to each other into separate regions.

Meanwhile, a user usually segments spaces at home, such as a bed room, a closet room, a living room, and a den, based on their attribute according to use purposes. Thus, there is a need for a method by which a moving robot segments regions and recognizes attributes of the regions in a similar manner as a user, so that the user is able to easily control the moving robot using the segmented regions.

BRIEF DESCRIPTION OF THE DRAWINGS

The embodiments will be described in detail with reference to the following drawings in which like reference numerals refer to like elements wherein:

FIG. 6 is a diagram showing an example of generating a map by a moving robot according to an embodiment of the present disclosure;

FIGS. 16 to 21, 22A-22D, and 23 are diagrams for explaining a control method of a moving robot according to an embodiment of the present disclosure.

DETAILED DESCRIPTION

Figure 1:
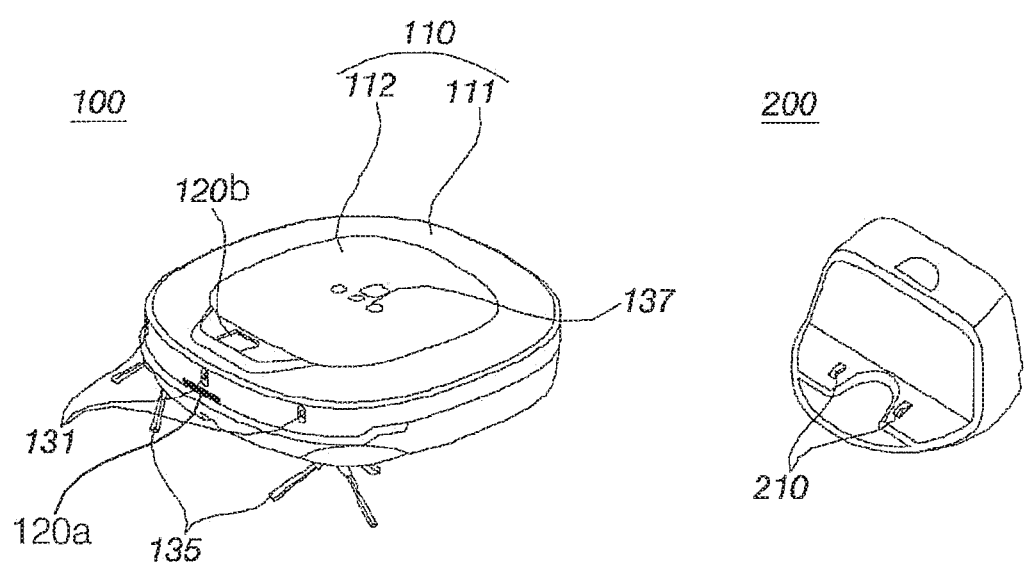
FIG. 1 is a perspective view showing a moving robot and a charging station for charging the moving robot according to an embodiment of the present disclosure.

Hereinafter, embodiments of the present disclosure will be described in detail with reference to the accompanying drawings. While the disclosure will be described in conjunction with exemplary embodiments, it will be understood that the present description is not intended to limit the disclosure to the exemplary embodiments.

In the drawings, in order to clearly and briefly describe the disclosure, parts which are not related to the description will be omitted and, like reference numerals refer to like elements throughout. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

A moving robot 100 according to an embodiment of the present disclosure refers to a robot capable of moving itself with a wheel and the like, and the moving robot 100 may be a humanoid robot assistant, a robot cleaner, etc. Hereinafter, with accompanying drawings, the moving robot will be described with an example of a robot cleaner capable of perform cleaning. However, aspects of the present disclosure are not limited thereto.

Figure 2:
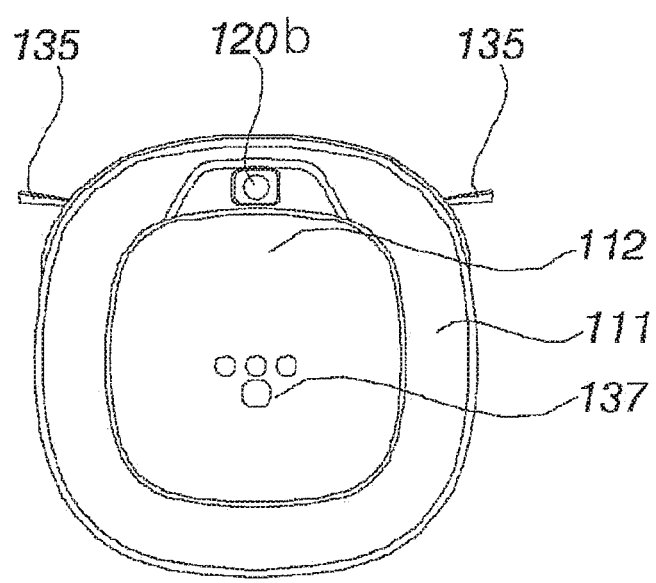
FIG. 2 is a view showing an upper surface of the moving robot shown in FIG. 1.
Figure 3:
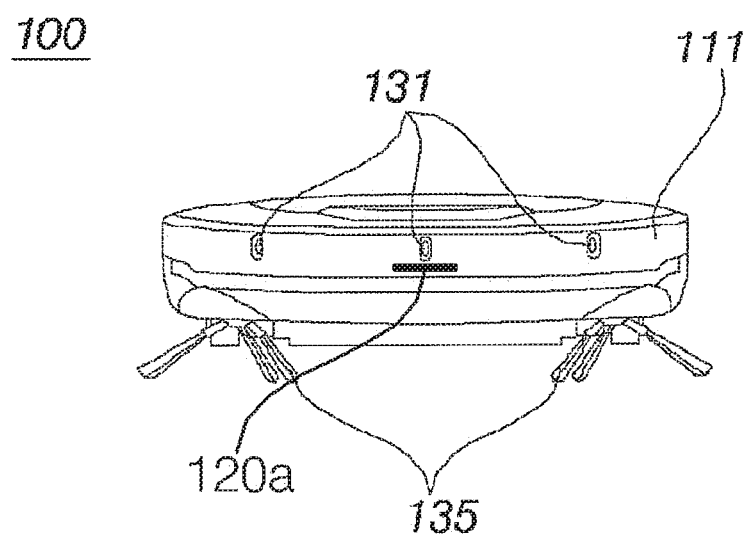
FIG. 3 is a view showing a front surface of the moving robot shown in FIG. 1.
Figure 4:
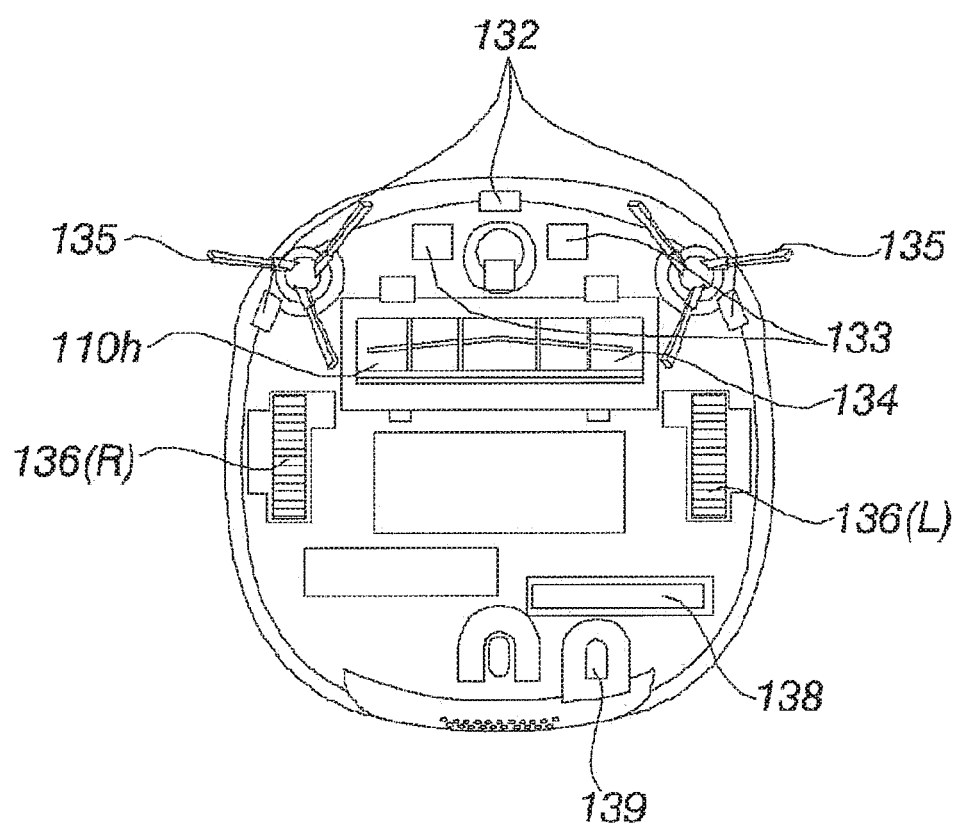
FIG. 4 is a view showing a bottom surface of the moving robot shown in FIG. 1.
Figure 5:
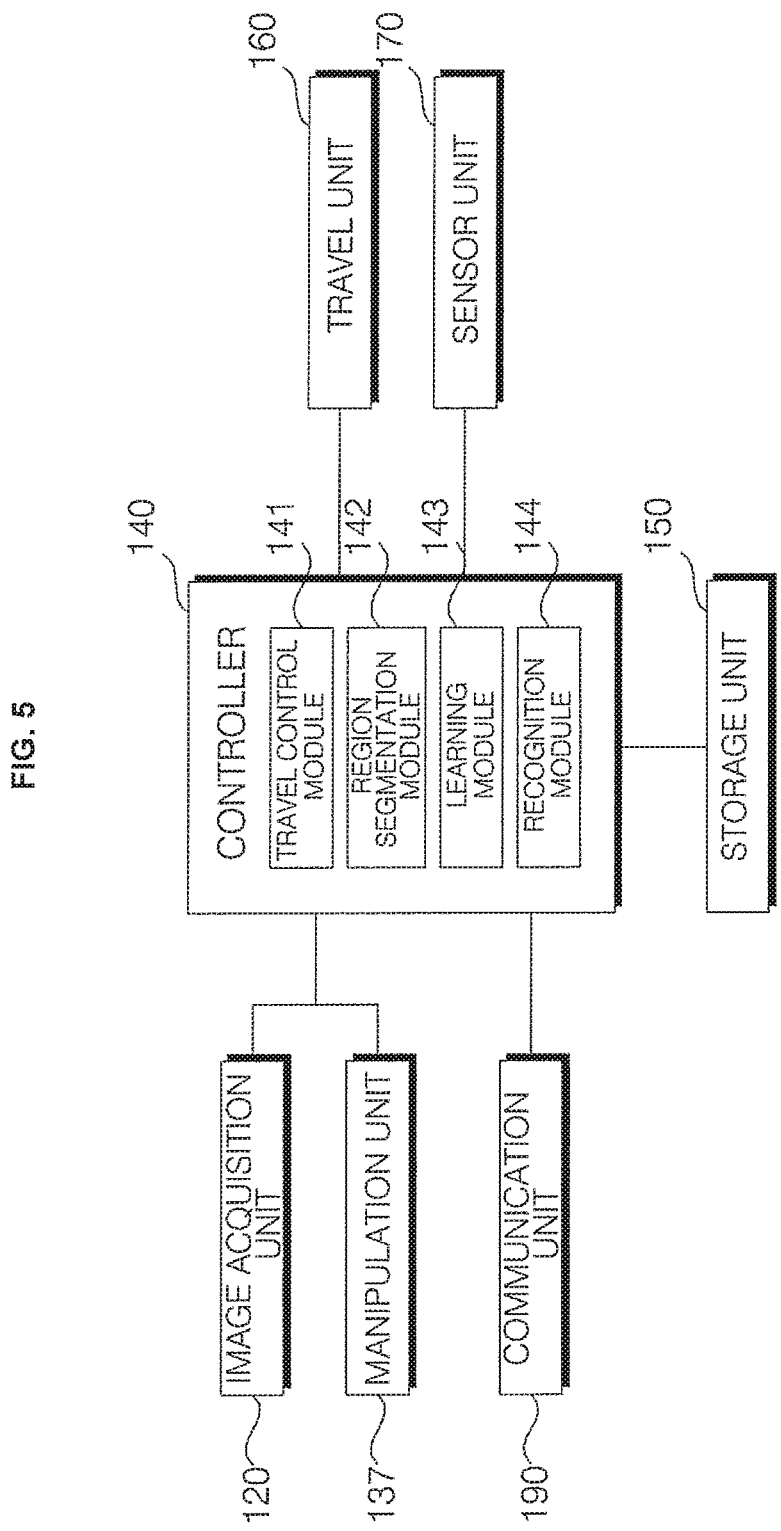
FIG. 5 is a block diagram illustrating control relationships between major components of a moving robot according to an embodiment of the present disclosure.

FIG. 1 is a perspective view showing a moving robot and a charging station for charging the moving robot according to an embodiment of the present disclosure, FIG. 2 is a view showing an upper surface of the moving robot shown in FIG. 1, FIG. 3 is a view showing a front surface of the moving robot shown in FIG. 1, and FIG. 4 is a view showing a bottom surface of the moving robot shown in FIG. 1. FIG. 5 is a block diagram illustrating control relationships between major components of a moving robot according to an embodiment of the present disclosure.

Referring to FIGS. 1 to 5, the moving robot 100 includes a main body 110, and an image acquisition unit (also referred to as a camera or or light sensor) 120 for acquiring images of surroundings of the main body 110. Hereinafter, parts of the main body 110 are defined as follows: a part facing a ceiling in a travel area is defined as an upper surface (see FIG. 2), a part facing a floor in a travel area is defined as a bottom surface (see FIG. 4), and a part facing a direction of travel in a portion constituting a circumference of the main body 110 between the upper surface and the bottom surface is defined as a front surface (see FIG. 3).

The moving robot 100 includes a travelling unit (or driving motor) 160 which moves the main body 110. The travel unit 160 includes at least one drive wheel 136 which moves the main body 110. The travel unit 160 includes a driving motor (not shown), which is connected to the drive wheel 136 and rotates the drive wheel 136. The drive wheel 136 may be provided in the left and right sides of the main body 110. Hereinafter, a drive wheel provided in the left side is referred to as a left wheel 136(L), and a drive wheel provided in the right side is referred to as a right wheel 136(R).

The left wheel 136(L) and the right wheel 136(R) may be driven by a single driving motor, and, if necessary, a left-wheel driving motor for driving the left wheel 1136(L) and a right-wheel driving motor for driving the right wheel 136(R) may be provided respectively. A direction of travel of the main body 110 may be converted to the left or to the right by differentiating a rotation speed between the left wheel 136(L) and the right wheel 136(R).

An inlet port 110*h* through which air is suctioned may be formed in the bottom surface of the main body 110. A suction device (not shown) for providing a suctioning force to suction air through the inlet port 110*h*, and a dust container (not shown) for collecting dust suctioned together with the air through the inlet port 110*h* may be provided in the main body 110.

The main body 110 may include a case 111 which forms a space where a variety of components of the moving robot 100 are accommodated. An opening for inserting and detaching the dust container may be formed in the case 111, and a dust container cover 112 for opening and closing the opening may be provided rotatable with respect to the case 111.

There may be a roll-type main brush 134 which has bristles exposed through the inlet port 110*h*, and an auxiliary brush 135 which is located at a front part of the bottom surface of the main body and which has bristles composed of a plurality of radially extending wings. Dust is separated from a floor in a travel area by rotation of the brushes 134 and 135, and the dust separated from the floor is suctioned through the inlet port 110 and then collected in the dust container.

A battery 138 supplies power not just for the driving motor but also for overall operation of the moving robot 100. If the battery 138 is run out, the moving robot 100 may travel to return back to a charging station 200 for charging. While returning back, the moving robot 100 may detect a location of the charging station 200 on its own.

The charging station 200 may include a signal transmitter (not shown) which transmits a predetermined return signal. The return signal may be an ultrasonic signal or an infrared signal, but aspects of the present disclosure are not limited thereto.

The moving robot 100 may include a signal detector (not shown) which receives a return signal. The charging station 200 may transmit an infrared signal through the signal transmitter, and the signal detector may include an infrared sensor which detects the infrared signal. The moving robot 100 moves to a location of the charging station 200 in accordance with an infrared signal transmitted from the charging station 200 and is then docked with the charging station 200. Due to the docking, charging is performed between a charging terminal 133 of the moving robot 100 and a charging terminal 210 of the charging station 200.

The image acquisition unit 120 may photograph a travel area and include a digital camera. The digital camera may include at least one optical lens, an image sensor including a plurality of photodiodes (e.g., pixels) to form an image by light passing through the optical lens, and a Digital Signal Processor (DSP) which constructs an image based on signals output from the photodiodes. The DSP is capable of generating not just a still image, but also a video composed of frames which constitute still images.

The image acquisition unit 120 may include a front camera 120*a* provided to acquire an image of an area in front of the main body 110, and an upper camera 120*b* provided in the upper surface of the main body 110 to acquire an image of a ceiling in a travel area. However, the locations and the photographing range of cameras included in the image acquisition unit 120 are not limited thereto.

In this embodiment, cameras may be installed at some parts (e.g., a front surface, a rear part, ad a bottom surface) of a moving robot and constantly acquire a photographed image during cleaning. Such cameras may be a plurality of cameras installed at multiple parts of the moving robot 100 for efficiency of photographing. An image photographed by a camera may be used to recognize an attribute of a corresponding space, to recognize a type of an object, such as dust existing in the space, hair, a floor, etc., to check whether cleaning has been done, or to check a cleaning time. The front camera 120*a* may photograph an image within a predetermined range of angle in a forward direction of travel of the moving robot 100, and photograph an obstacle or a situation of a cleaning area existing in the forward direction of travel.

According to an embodiment of the present disclosure, the main body 110 of the image acquisition unit 120 may acquire a plurality of images by constantly photographing a surrounding area, and may store the plurality of acquired images in a storage unit 150. The moving robot 100 may improve accuracy of recognition of an area or an object using a plurality of images, or may improve accuracy of recognition using efficient data by selecting one or more images from among the plurality of images.

In addition, the moving robot 100 may include a sensor unit (or sensor) 170 including sensors for sensing diverse data relating to an operation and a state of the moving robot 100. For example, the sensor unit 170 may include an obstacle sensor 131 for sensing an object located in a forward direction. In addition, the sensor unit 170 may further include a cliff sensor 132 for detecting existence of a cliff in a floor within a travel area, and a lower camera sensor 139 for acquiring an image of the floor.

Referring to FIGS. 1 and 3, the obstacle sensor 131 may include a plurality of sensors installed at predetermined intervals in a circumferential surface of the moving robot 100. For example, the sensor unit 170 may include a first sensor provided at a front surface of the main body 110, and second and third sensors spaced apart from the first sensor in the left and right directions.

The obstacle sensor 131 may include an infrared sensor, an ultrasonic sensor, an RF sensor, an geomagnetic sensor, a Position Sensitive Device (PSD) sensor, etc. Meanwhile, the positions and types of sensors included in the obstacle sensor 131 may vary depending on a model of the moving robot 100, and the obstacle sensor 131 may further include a variety of sensors.

The obstacle sensor 131 is a sensor for detecting a distance to an indoor wall or an object, and a type of the obstacle sensor 131 is not limited in the present disclosure. Hereinafter, the obstacle sensor 131 will be exemplarily described as an ultrasonic sensor.

The obstacle sensor 131 detects an object, especially an obstacle, existing in a direction of travel (movement) of the moving robot 100, and transmit information on the obstacle to a controller 140. That is, the object detection sensor 131 may detect a projection, a home appliance, furniture, a wall surface, a wall edge, or the like existing in a direction of travel of, in front of, or in one side of the moving robot 100, and may transmit information on the detected object to a control unit.

In this case, the controller 140 may detect a location of an obstacle based on at least two signals received through an ultrasonic sensor, and control movement of the moving robot 100 in accordance with the detected location of the obstacle.

In some implementations, the obstacle sensor 131 provided at an outer surface of the case 110 may include a transmitter and a receiver. For example, an ultrasonic sensor may include at least one transmitter and at least two receivers crossing each other. Accordingly, the ultrasonic sensor may irradiate a signal at a variety of angles, and receive a signal reflected from an obstacle at a variety of angles. In some implementations, a signal received by the obstacle sensor 131 may go through a signal processing procedure, such as amplification and filtering, and then a distance to an obstacle and a direction toward the obstacle may be calculated.

Meanwhile, the sensor unit 170 may further include an operation sensor which senses operation of the moving robot 100 dependent upon driving of the main body 110 and outputs operation information. As the operation sensor, a gyro sensor, a wheel sensor, an acceleration sensor, or the like may be used. Data senses by the operation sensor or data calculated based on the data detected by the operation sensor may construct odometry information.

The gyro sensor senses a rotation direction and a rotation angle when the moving robot 100 moves according to an operation mode. The gyro sensor detects an angular velocity of the moving robot 100 and outputs a voltage value proportional to the angular velocity. The controller 140 may calculate a rotation direction and a rotation angle using a voltage value output from the gyro sensor.

The wheel sensor is connected to the left wheel 136(L) and the right wheel 136(R) to thereby sense the number of rotation of each of the wheels. In this case, the wheel sensor may be a rotary encoder. The rotary encoder senses and outputs the number of rotation of each of the left wheel 136(L) and the right wheel 136(R).

Using the number of rotation, the controller 140 may calculate a rotation speed of each of the left wheel 136(L) and the right wheels 136(R). In addition, the controller 140 may calculate a rotation angle using difference in the number of rotations between the left wheel 136(L) and the right wheel 136(R).

The acceleration sensor senses a change in the moving robot 100 caused by a change in speed of the moving robot 100, such as starting, stopping, converting of a direction, and colliding with an object. The acceleration sensor may be attached adjacent to a main wheel or an auxiliary wheel to thereby detect slipping or idling of a corresponding wheel.

In addition, the acceleration sensor may be embedded in the controller 140 and sense change in speed of the moving robot 100. That is, the acceleration sensor detects an amount of impact responsive to change in speed, and outputs a voltage value corresponding to the detected amount of impact. Thus, the acceleration sensor may perform a function of an electronic bumper.

The controller 140 may calculate a change in a location of the moving robot 100 based on operation information output from the operation sensor. Such a location is a relative location corresponding to an absolute location which is based on image information. The moving robot 100 may improve location recognition performance based on image information and obstacle information by recognizing the relative location.

Meanwhile, the moving robot 100 may include a power supply, which includes a rechargeable battery 138 to supply power to a robot cleaner. The power supply supplies driving power and operating power to each component of the moving robot 100. If a little amount of power remains, the power supply may receive charging currents from the charging station 200 to be charged.

The moving robot 100 may further include a battery detector (not shown) which detects the charge state of the battery 138 and transmits a detection result to the controller 140. As the battery 138 is connected to the battery detector, the remaining battery capacity and the charge state of the battery 138 are transmitted to the controller 140. The remaining battery capacity may be displayed on a screen of an output unit (not shown).

In addition, the moving robot 100 may include a manipulation unit (or user input device) 137 which enables inputting an on/off command or a variety of commands. through the manipulation unit 137, the moving robot 100 may receive a variety of control commands required for overall operations of the moving robot 100. In addition, the moving robot 100 may include an output unit (not shown) to display reservation information, a battery state, an operation mode, an operation state, an error state, etc.

Referring to FIG. 5, the moving robot 100 may include the controller 140 for processing and determining diverse information, such as recognizing the current location, and the storage unit 150 for storing various types of data. In addition, the moving robot 100 may further include a communication unit (or communication interface or antenna) 190 for transmitting and receiving data.

The moving robot 100 may receive a command regarding an operation through a remote controller (not shown) or a terminal (not shown). The terminal may include an application for controlling the moving robot 100, and may display a map of a travel area to be cleaned by the moving robot upon execution of the application and designate a particular region in the map to perform cleaning. The terminal may be, for example, a remote controller embedded with an application for map setting, a PDA, a laptop, a tablet PC, and a smart phone.

The terminal may communicate with the moving robot 100 to receive and display a map and display the current location of the moving robot 100 on the map. In addition, the terminal displays the current location by updating the same in accordance with travelling of the moving robot 100.

The controller 140 controls the image acquisition unit 120, the manipulation unit 137, and the travel unit 160 of the moving robot 100 to thereby control overall operations of the moving robot 100. The controller 140 may also control a storage unit 150 to store data.

The storage unit 150 stores a various kinds of information necessary to control the moving robot 100, and the storage unit 150 may include a volatile or non-volatile recording medium. The recording medium stores data readable by a micro-processor, and the recording medium may include a Hard Disk Drive (HDD), a Solid State Disk (SSD), a Silicon Disk Drive (SDD), a ROM, a RAM, a CD-ROM, a magnetic tape, a floppy disk, an optical data storage device, etc.

The storage unit 150 may store a map of a travel area. In addition, the storage unit 150 stores information on an obstacle sensed during traveling, a location of a charging station, and data which is set for search of the charging station. In this case, the map stored in the storage unit 150 may be generated by the moving robot 100 through self-learning, or may be input by a terminal which is capable of exchanging information through wired or wireless communication with the moving robot 100.

On a map, locations of rooms in a travel area may be displayed on the basis of regions. In addition, the current location of the moving robot 100 may be displayed on a map and updated during traveling. The terminal stores the same map as a map stored in the storage unit 150.

A map of a travel area stored in the storage unit 150 may be a navigation map used for travelling during cleaning, a Simultaneous Location And Mapping (SLAM)-based map used for location recognition, a learning map which is generated by learning information on collision with an obstacle upon the collision and which is used for cleaning, a global localization map used for global localization recognition, and an obstacle recognition map in which information on a recognized obstacle is recorded.

Meanwhile, as described above, maps may be stored and managed in the storage unit 150 in a distinguishable manner according to purposes of use or in a not very clearly distinguishable manner according to purposes of use. For example, a plurality of information items may be stored in one map so as to be used for two or more purposes.

The controller 140 performs cleaning by suctioning dust or foreign substances in the surroundings of the moving robot 100 during traveling. The controller 140 collects dust or foreign substances in the surroundings of the moving robot 100 by operating brushes, and suctions the dust or foreign substance by operating the suction device.

The controller 140 may instruct cleaning of at least one of a plurality of regions, move to a designated area by the travelling unit 160, and then start to clean. Even during moving by the travelling unit 160, the moving robot 100 is able to perform cleaning.

The controller 140 determines when to return back to the charging station 200, by checking a battery capacity. When the battery capacity reaches a predetermined value, the controller 140 stops an ongoing operation and starts to search for the charging station 200 in order to return back to the charging station 200. The controller 140 may output an alarm regarding a battery capacity, and an alarm regarding returning back to the charging station 200.

The controller 140 may include a travel control module 141, a region segmentation module 142, a learning module 143, and a recognition module 144. Each of the travel control module 141, the region segmentation module 142, the learning module 143, and the recognition module 144 may include a separate processor or circuitry or may be embodied in different software executed by a common processor or circuitry.

The travel control module 141 is to control traveling of the moving robot 100, and controls driving of the travel unit 160 according to travel settings. In addition, based on operation of the travel unit 160, the travel control module 141 may figure out a moving path of the moving robot 100. For example, based on a rotation speed of the drive wheel 136, the travel control module 141 may figure out the current or past moving speed and a traveled distance. In addition, based on a rotation direction of each of the drive wheels 136(L) and 136(R), the travel control module 141 may figure out the current or past direction converting procedure as well. Based on traveling information of the moving robot 100, which is figured out in the above manner, a location of the moving robot 100 in the map may be updated.

The region segmentation module 142 may segment a travel area into a plurality of regions by a predetermined standard. The travel area may be defined as a range including all regions on a plane previously and currently travelled by the moving robot 100.

The region segmentation module 142 may segment the travel area into a plurality of small regions, and each of the small region may be segmented on the basis of each room in the travel area. In addition, the region segmentation module 142 may segment a travel area into a plurality of large regions which are separate according to a traveling capability of the moving robot. In one example, two indoor places totally separated in terms of a travel route may be classified as two large regions. In another example, even in the same indoor place, the large regions may be segmented on the basis of stories.

If a basic map where regions are segmented is initially generated through a learning module, the region segmentation module 142 may segment the basic map into a plurality of cells (local maps), recognize regions of the respective cells, and merge the recognition results to thereby generate a final map where the regions are segmented.

Alternatively, if a basic map where regions are segmented is initially generated through a learning module, the region segmentation module 142 may separate a small region by utilizing erosion and dilation, and then set a representative region. After setting the representative region, the region segmentation module 142 may extract any separated small region as a detail region, and then merge the small region into any one representative region to thereby generate a final map where regions are segmented.

The learning module 143 may generate a map of a travel area. In addition, the learning module 143 may recognize a global localization of the moving robot 100 by processing an image acquired by the image acquisition unit 120 at each location and associating the processed image with the map.

The recognition module 144 estimates and recognizes the current location of the moving robot 100. The recognition module 144 figures out a location of the moving robot 100 using image information of the image acquisition unit 120 while interworking with the learning module 143. Thus, it is possible to estimate and recognize the current location of the moving robot 100 even in the case where the location of the moving robot 100 is suddenly changed.

The moving robot 100 may recognize a location thereof through the region segmentation module 142 during continuous traveling. In addition, even without the region segmentation module 142, the moving robot 100 may learn a map and estimate the current location through the learning module 143 and the recognition module.

Meanwhile, FIG. 5 shows an example in which the learning module 143 and the recognition module 144 are additionally provided in the controller 140, but aspects of the present disclosure are not limited thereto. For example, the learning module 143 and the recognition module 144 may be integrally formed as a single classifier. In this case, the classifier is trained using a learning technique, such as machine learning, and the trained classifier may classify input data to recognize an attribute of a region, an object, or the like.

During traveling of the moving robot 100, the image acquisition unit 120 acquires images of the surroundings of the moving robot 100. Hereinafter, an image acquired by the image acquisition unit 120 is defined as an "acquired image". The acquired image includes various features, such as lighting devices, an edge, a corner, a blob, a ridge, and the like located on a ceiling.

The learning module 143 detects features from each acquired image. In a computer vision field, various feature detection methods for detecting features from an image are well known. In addition, various feature detectors appropriate to detect such features are well known. For example, there are a Canny detector, a Sobel detector, a Harris&Stephens/Plessey detector, a SUSAN detector, a Shi&Tomasi detector, a Level curve curvature detector, a FAST detector, a Laplacian of Gaussian detector, a Difference of Gaussians detector, a Determinant of Hessian detector, a MSER detector, a PCBR detector, a Grey-level blobs detector, etc.

The learning module 143 creates a descriptor based on each feature. For feature detection, the learning module 143 may convert a feature into a descriptor using Scale Invariant Feature Transform (SIFT). A descriptor may be represented by an n-dimensional vector.

The SIFT may detect a feature which is invariant to scale, rotation, change of brightness of a target object to be photographed. Thus, using the SIFT, it is possible to detect a feature (that is, a rotation-variant feature) that is invariant even when the same region is photographed by changing the posture of the moving robot 100. Of course, aspects of the present disclosure are not limited thereto, and other various techniques (e.g., Histogram of Oriented Gradient (HOG), Haar feature, Fems, Local Binary Pattern (LBP), Modified Census Transform (MCT)) may be applied.

Based on descriptor information obtained from an image acquired at each location, the learning module 143 may classify at least one descriptor of each acquired image into a plurality of groups by a predetermined low-level classification rule. Then, the learning module 143 may convert descriptors in the same group into low-level representative descriptors by a predetermined low-level representative rule.

In another example, the learning module 143 may classify all descriptors obtained from acquired images of a particular region, such as a room, into a plurality of groups by the predetermined low-level classification rule. Then, the learning module 143 may covert descriptors in the same group into low-level representative descriptors by the predetermined low-level representative rule.

The learning module 143 may obtain feature distribution at each location through the above-described procedure. The feature distribution at each location may be represented by a histogram or an n-dimensional vector. In another example, the learning module 143 may estimate an uncertain current location based on a descriptor calculated from each feature, without using a particular low-level classification rule and a particular low-level representative rule. In addition, in the case where the current location of the moving robot 100 has become unknown due to location jumping, it is possible to estimate the current location based on data, such as a pre-stored descriptor or a low-level representative descriptor.

The moving robot 100 acquires an acquired image through the image acquisition unit 120 at an unknown current location. Various features, such as lighting devices, an edge, a corner, a blob, and a ridge located on a ceiling, are found in an image.

The recognition module 144 detects features from an acquired image. Various methods for detecting features from an image in a computer vision field, and various feature detectors appropriate for the methods are the same as described above.

The recognition module 144 creates a recognition descriptor based on each recognition feature. The recognition feature and the recognition descriptor are used to describe a process performed by the recognition module 144 distinguishably from a process performed by the learning module 143. However, they are merely different terms used to define features of a world external to the moving robot 100.

The recognition module 144 may convert a recognition feature into a recognition descriptor using the SIFT in order to detect a feature. The recognition descriptor may be represented by an n-dimensional vector.

As described above, the SIFT is an image recognition technique that selects an easily distinguishable feature such as a corner in an acquire image and obtains an n-dimensional vector, which is a dimensional number indicative of how dramatic a degree of change in each direction is regarding brightness gradient distribution (a direction of a change in brightness and how dramatic a degree of the change) of pixels in a particular region around each feature.

Based on information about at least one recognition descriptor obtained from an image acquired at an unknown current location, the recognition module 144 converts into location information subject to be compared (e.g., feature distribution at each location) and comparative information (lower-level feature distribution).

By a predetermined low-level comparison rule, feature distribution at each location may be compared with each recognition feature distribution to thereby create a similarity level for each location. A similarity level (probability) for each location may be calculated, and a location having the greatest probability may be determined as the current location.

As such, the controller 140 generates a map where a travel area is segmented into a plurality of regions. In addition, the controller 140 may recognize the current location of the main body 110 based on a stored map.

When a map is generated, the controller 140 transmits the generated map to an external terminal through the communication unit 190. In addition, as described above, when a map is received from an external terminal, the controller 140 may store the received map in the storage unit 150.

In addition, when a map is updated during travelling, the controller 140 may transmit updated information to an external terminal so that the same map is managed to be stored in the external terminal and the moving robot 100. As the same map is managed to be stored in both the external terminal and the moving robot 100, the moving robot 100 is able to clean a designated region in accordance with a cleaning command from the external terminal, and the current location of the moving robot 100 may be displayed in the external terminal.

At this point, the map shows a cleaning area segmented into a plurality of regions and includes connection channels connecting the plurality of regions to each other and information on an object in each region. The cleaning area may be segmented into small regions and large regions by the region segmentation module 142, as described above.

When a cleaning command is received, the controller 140 determines whether a location on a map coincides with the current location of the moving robot 100. The cleaning command may be received through a remote controller, a manipulator, or an external terminal.

When the current location of the moving robot 100 does not coincide with the location on the map or when it is not possible to confirm the current location of the moving robot 100, the controller 140 may recognize and restore the current location of the moving robot 100 and then control the travel unit 160 based on the current location so as to move to a designated region.

When the current location of the moving robot 100 does not coincide with the location on the map or when it is not possible to confirm the current location of the moving robot 100, the recognition module 144 may estimate the current location by analyzing an acquired image received from the image acquisition unit 120. In addition, the region segmentation module 142 or the learning module 143 may be also able to recognize the current location in the same manner as described above.

By recognizing and restoring the current location of the moving robot 100, the travel control module 141 calculates a moving path from the current location to the designated region, and controls the travel unit 160 to move to the designated region. When at least one region out of a plurality of regions is selected by an external terminal, the travel control module 141 sets the designated region as a designated region and calculates a moving path. After moving to the designated region, the travel control module 141 performs cleaning.

Meanwhile, when a plurality of regions is selected as designated regions, the travel control module 141 determines whether a higher priority region among a the plurality of regions is set or whether an order of cleaning of the plurality of designated regions is set. Then, the travel control module 141 moves to the designated regions and performs cleaning.

When any one out of the plurality of designated regions is set as a higher priority region, the travel control module 141 first moves to the higher priority region and performs cleaning, and then moves the moving robot 100 to other designated regions and performs cleaning. In addition, when the order of cleaning of the plurality of designated regions, the travel control module 141 performs cleaning while moving to the designated regions sequentially according to the order. In addition, when any random region is newly set as a designated region, regardless of a plurality of regions segmented on a map, the travel control module 141 moves the moving robot 100 to the set designated region and performs cleaning.

When cleaning of a set designated region is completed, the controller 140 stores cleaning record in the storage unit 150. In addition, the controller 140 transmits an operation state or a cleaning state of the moving robot 100 in a predetermined cycle to the external terminal through the communication unit 190. Accordingly, based on received data, the external terminal displays a location of the moving robot along with a map on a screen of a currently executed application, and outputs information on the cleaning state.

In addition, when the charging station 200 is detected using a return signal of the charging station 200, the controller 140 recognizes the current location of the moving robot 100, calculates a location of the charging station 200 based on the current location of the moving robot 100, and stores the location of the charging station 200. In addition, the controller 140 may set the location of the charging station 200 to be displayed on the map.

FIG. 6 is a diagram showing an example in which a moving robot according to an embodiment of the present disclosure segments regions and accordingly generate a map. As illustrated in section (a) of FIG. 6, when no map is stored, the moving robot 100 may generate a map while traveling a travel area X1 by executing wall following.

The region segmentation module 142 generates a map, as illustrated in section (c) of FIG. 6, by segmenting the travel area X1 into a plurality of regions A1' to A9', as illustrated in section (b) of FIG. 6. The generated map is stored in the storage unit 150 and transmitted to an external terminal through the communication unit 190. As described above, the region segmentation module 142 segments the travel area X1 into small regions and large regions and generates a map according thereto.

The external terminal executes an application and displays a received map on a screen. In this case, the plurality of segmented regions A1 to A9 are displayed differently. The plurality of regions A1 to S9 on the map may be displayed in different colors or with different names.

The moving robot and the external terminal basically stores the same map. In this case, the external terminal displays a user map, as in (c) of FIG. 6, where regions are simplified so that a user is able to easily recognize the regions, and the moving robot 100 travels and perform cleaning based on a map, as in (b) of FIG. 6, where information on an object is included. Even in the user map shown in (c) of FIG. 6, an object may be displayed. The exemplary map shown in (b) of FIG. 6 may be a SLAM map or a navigation map being based on an SLAM map.

When a cleaning command is input, the moving robot 100 determines the current location based on a stored map. When the current location coincides with a location on the map, the moving robot 100 performs designated cleaning. When the current location does not coincide with a location on the map, the moving robot 100 recognizes and restores the current location and performs cleaning. Therefore, regardless of where the moving robot 100 is positioned in the plurality of regions A1 to A9, it is possible to determine the current location, move to a designated region, and perform cleaning.

As illustrated in the drawing, a remote controller or a terminal may select at least one region out of the plurality of regions A1 to A9 and input a cleaning command to the moving robot 100. In addition, the moving robot 100 may set part of any one region as a cleaning area through the remote controller or the terminal, or may set a cleaning area through touching or dragging over the plurality of regions.

When a cleaning command for a plurality of regions is received, the moving robot 100 may set one of the plurality of regions as a higher priority region, may first perform cleaning in a higher priority region and then move to any nearby region to perform cleaning, or may set a cleaning order. When the order of cleaning of a plurality of designated regions is set, the moving robot 100 performs cleaning while moving according to the set order. When an additional order of cleaning of a plurality of cleaning areas is not set, the moving robot 100 may move to a region close to the current location and perform cleaning.

Figure 7:
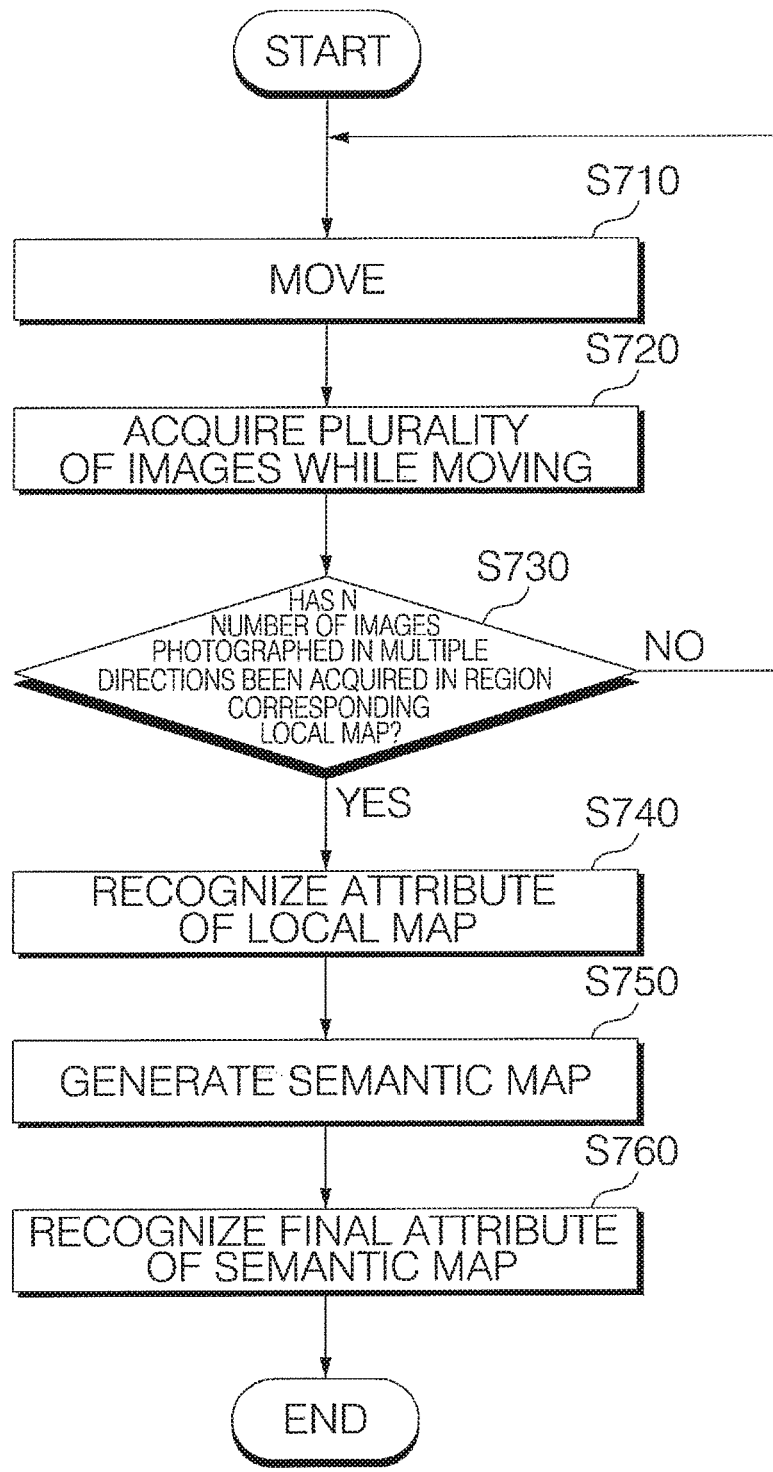
FIG. 7 is a flowchart illustrating a control method of a moving robot according to an embodiment of the present disclosure.

FIG. 7 is a flowchart illustrating a control method of a moving robot according to an embodiment of the present disclosure. Referring to FIGS. 1 to 7, the moving robot 100 may perform cleaning while moving in accordance with a command or a setting in S710. For example, the moving robot 100 may move based on a navigation map. The navigation map may be a map generated based on an SLAM map, or may be a map illustrated in (b) of FIG. 6.

Meanwhile, the navigation map may include a plurality of local maps. The navigation maps may be segmented into a plurality of regions, and each region may include one or more local maps. Each local map is set not to overlap one another. The local map is a kind of a unit map and may be set in an arbitrary size. For example, the local map may be set in an N-by-N square or any other shape.

Meanwhile, the region segmentation module 142 may segment a travel area into a plurality of small regions. For example, if a basic map where regions are not segmented is initially generated through a learning module, the region segmentation module 142 may segment the basic map into a plurality of local maps, recognize regions of the respective local maps, and merge the recognition results to thereby generate a final map where regions are segmented.

Alternatively, if a basic map where regions are not segmented is initially generated through a learning module, the region segmentation module 142 may separate a small region by using erosion and dilation, and set a representative region. After setting the representative region, the region segmentation module 142 may extract any separated small region as a detail region, and merge the extracted small region into any one representative region to thereby generate a final map where regions are segmented.

In this case, the region segmentation module 142 may set a representative region in a manner that separates a small region by erosion and dilation of the basic map through a morphology calculation. Accordingly, a small region with a narrow width or a small area in the basic map may disappear or may be partially left, and a region whose area is large is partially left. By merging detail region into the left large-sized region, it is possible to segment an indoor travel area into the large-sized regions distinguishable from each other by boundaries which are narrow-width regions, such as a region where a door is installed.

Meanwhile, during movement of the moving robot 100, a plurality of images may be acquired in regions corresponding to the plurality of local maps through the image acquisition unit 120 in S720. During movement, the image acquisition unit 120 may acquire images of the surroundings of the main body 110 through the front camera 120*a* provided to acquire an image of an area in front of the main body 110, and through the upper camera 120*b* provided on the upper surface of the main body 110.

Meanwhile, the controller 140 may control the image acquisition unit 120 not to additionally perform photographing in a region corresponding to a local map in which an N number of images photographed in multiple directions is acquired. If data sets as many as necessary for attribute recognition is secured, no more image is acquired so as to prevent unnecessary computation, processing, and recognition procedures.

In some implementations, the controller 140 may filter some image out of a plurality of images, acquired by the image acquisition unit 120, by a predetermined standard. For example, the predetermined standard may include whether or not the sensor unit 170 has sensed an obstacle. When the sensor unit 170 senses an obstacle, a photographed image is effective in recognizing the obstacle, but it may sometimes disturb recognizing attributes of the entire region. For example, if an image of a part of the entire region, such as a wall, a desk, or a big-sized object, is photographed, the image may be filled up with only part of an obstacle. In this case, it may be difficult to recognize the obstacle based on that part, and it may be much harder to recognize the entire region.

In addition, the predetermined standard may further include whether the moving robot 100 is located within a particular region, and whether a pose (or a direction) of the moving robot 100 is toward the center of the particular region. That is, only images which are left after filtering of images inappropriate for recognizing attributes of the particular region may be used to recognize the attributes of the particular region.

Alternatively, the controller 140 may determine whether to perform photographing by a predetermined standard. Even in this case, the predetermined standard may include whether the sensor unit 170 has sensed an obstacle. In addition, the predetermined standard may further include whether the moving robot 100 is located within a particular region, and whether a pose (or a direction) of the moving robot 100 is toward the center of the particular region.

That is, the controller 140 may filter acquired images by a predetermined standard not to use the filtered images in recognizing attributes, or may control the image acquisition unit 140 not to photograph by a predetermined standard. In this manner, it is possible to prevent use of data which may degrade accuracy of attribute recognition.

Meanwhile, by using an image acquired by the image acquisition unit 120 as input data, the controller 140 may recognize a region corresponding to the image and an object existing in the image. More preferably, the controller 140 may recognize attributes of a region and an object based on images acquired by the front cameras 120*a*.

Meanwhile, in order to improve accuracy of a recognition result, the controller 140 may perform region recognition on a plurality of images photographed in a particular region, and aggregate all the recognition results. To this end, during movement, the moving robot 100 may continuously photograph images by a predetermined standard through the image acquisition unit 120. If the number of images photographed in a region corresponding to a particular local map becomes equal to or greater than a predetermined reference number in S730, the controller 140 may recognize an attribute of the region in S740.

More preferably, in S740, the controller 140 may recognize an attribute of a local map in which an N number of images photographed in multiple directions is acquired among the plurality of local maps. For example, the reference number N may be set to be 4, 5, and 16 corresponding to 4 directions (North, East, South, West), 8 directions, and 16 directions. In some implementations, the N number of images photographed in multiple directions may be the N number of images which the moving robot 100 photographs while turning at a particular location.

However, it is inefficient for the moving robot 100 to turn at a plurality of locations in the entire travel area to acquire images for attribute recognition. In addition, as it is hard for a user to understand that the moving robot 100 repeatedly stops and turns in its place, it may downgrade product reliability.

Thus, it is more desirable to acquire images for attribute recognition during normal traveling for cleaning. For example, while the moving robot 100 travels in a zigzag pattern, the image acquisition unit 120 may continuously acquire images, and the controller 140 may classify the acquired images based on photographing locations and perform control to secure an N number of data sets in a region that corresponds to a particular local map.

More preferably, under the control of the controller 140, the travel unit 160 may move the main body 110 so as to carry out the first round travel indicative of traveling a zigzag pattern in a first direction and then carry out the second round travel indicative of traveling in a zigzag pattern in a second direction. In this case, the N number of images photographed in multiple directions may include an image acquired in the first round travel and an image acquired in the second round travel.

That is, the controller 140 may perform control to travel in zigzag patterns of multiple directions, and perform control to classify images, which are acquired during the zigzag-patterned traveling in the multiple directions, based on locations to thereby secure an N number of data sets in a region corresponding to a particular local map.

Meanwhile, the controller 140 may perform control to store the plurality of images in the storage unit 150 in association with location information, direction information, following line information, and local map information which correspond to a time of acquiring the plurality of images. If a plurality of images photographed in multiple directions, for example, 4 (North, East, South, West), 8, or 16 directions, is acquired in a region corresponding to a particular local map in S730, the controller 140 may recognize an attribute of the local map using the images photographed in the multiple directions in S740.

In addition, the controller 140 may perform control to store the attribute recognition result of the local map in the storage unit 150. By using all or some of the N number of images photographed in the multiple directions as input data, the controller 140 may perform attribute recognition based on machine learning and output results thereof.

Meanwhile, the controller 140 may generate a semantic map composed of a predetermined number of neighboring local maps among the plurality of local maps in S750. Based on attribute recognition results of the local maps included in the semantic map, the controller 140 may recognize a final attribute of a region corresponding to the semantic map in S760.

The controller 140 may generate a semantic map in S750 by grouping neighboring local maps among local maps regarding which attribute recognition has been completed. Then, the controller 140 may recognize a final attribute of a region corresponding to the semantic map based on attribute recognition results of the local maps included in the semantic map in S760.

Alternatively, the controller 140 may generate a semantic map in advance in S750 by grouping neighboring local maps. If attribute recognition regarding the local maps included in the semantic map is completed in S740, the controller 140 may recognize a final attribute of a region corresponding to the semantic map based on attribute recognition results of the local maps included in the semantic map in S760.

Meanwhile, based on the N number of images acquired from the local map, the controller 140 may recognize a region corresponding to the local map. In addition, the controller 140 may extract an image corresponding to an object from the N number of images acquired from the local map. Based on the extracted image, the controller 140 may recognize the object existing in the region corresponding to the local map.

In this case, the controller 140 may perform control to cut and extract a partial region of an image, acquired by the image acquisition unit 120, in a direction in which an object sensed by the sensor unit 170 is located. In some implementations, the controller 140 may extract part of an image by itself, or may control an image processing unit (not shown) provided separately from the controller 140 or control the image acquisition unit 120 so as to extract part of an image.

Meanwhile, the learning module 143 and/or the recognition module 144 may recognize an attribute of a particular region based on data which is pre-learned on an entire image through machine learning. In addition, the learning module 143 and/or the recognition module 144 may recognize an object based on data which is pre-learned on at least part of an image through machine learning.

To this end, the learning module 143 and/or the recognition module 144 may include a Artificial Neural Network (ANN) which is trained to recognize attributes, such as a type of an obstacle, through machine learning, and the learning module 143 and/or the recognition module 144 may recognize attributes of a region and an object based on the pre-learned data. The machine learning means that a computer performs learning on data without a logic instructed by a user, so that the computer is able to solve a problem on its own.

For example, the learning module 143 and/or the recognition module 144 may include a Convolutional Neural Network (CNN). A pre-trained CNN may recognize attributes of a region and an object included in input data and output the attribute recognition results.

Deep learning, which is a kind of machine learning, indicates performing learning by going deep into multiple layers based on data. The deep learning may be a set of machine learning algorithms to extract key data from a plurality of data sets in a higher level. Deep learning architectures may include an Artificial Neural Network (ANN), and the deep learning architecture may be a Deep Neural Network (DNN), such as Convolutional Neural Network (CNN), Recurrent Neural Network (RNN), a Deep Belief Network (DBN), etc.

The ANN may extract feature information corresponding to each level using a learned layer which corresponds to each level. The ANN may perform abstraction sequentially and recognize a particular target using the highest-level feature information.

For example, a procedure of face recognition based on deep learning is such that a computer identifies bright pixels and dark pixels from an input image according to brightness levels, identifies simple shapes, such as an outline and an edge, and then identifies more complicated shapes and objects. Lastly, the computer is able to identify a shape that defines a human face.

A deep learning architecture according to the present disclosure may use various well-known architectures. For example, the deep learning architecture according to the present disclosure may be a CNN, RNN, DBN, etc. The RNN is primarily used for natural language processing and efficient in processing time-series data which varies over time. Thus, the RNN may build up layers each time to thereby construct an ANN architecture.

The DBN is a deep learning architecture constructed by building up Restricted Boltzman Machine (RBM) in multiple layers. If a predetermined number of layers is made by repeating RBM learning, it is possible to construct a DBN having the corresponding number of layers.

The CNN is used especially in object recognition. The CNN is a model that imitates a human brain in the assumption that a human extracts basic features of an object, go through complicated computations in the brain, and recognizes the object based on the computation results.

Meanwhile, FIG. 5 shows an example in which the learning module 143 and the recognition module 144 are additionally provided in the controller 140, but aspects of the present disclosure are not limited thereto. For example, the learning module 143 and the recognition module 144 may be integrally formed as a single classifier. In this case, the classifier is trained using a learning technique, such as machine learning, and the trained classifier is able to classify input data and recognize an attribute of a region or an object.

The controller 140 may determine an attribute of the local map by classifying the N number of images acquired in the local map based on data which is pre-learned through machine learning. Meanwhile, the controller 140 may generate a final recognition result of the local map by merging a region recognition result and an object recognition result corresponding to the local map.

The controller 140 may determine a final attribute of the region corresponding to the semantic map based on at least one of frequencies, confidence values, or average confidence values of the recognition results of the plurality of local maps. In one example, the learning module 143 and/or the recognition module 144 may determine that a recognition result having the highest frequency among a plurality of recognition results (which are recognition results of local maps included in a corresponding semantic map) is a final attribute of the semantic map. That is, an attribute having been determined the greatest number of times among the plurality of recognition results may be selected as a final attribute.

In another example, the learning module 143 and/or the recognition module 144 may determine that a recognition result having the highest confidence value is a final attribute of the semantic map. That is, an attribute determined based on a recognition result having the highest confidence value among a plurality of recognition results may be selected as a final attribute.

In yet another example, the learning module 143 and/or the recognition module 144 may determine that a recognition result having the highest average confidence value among averages confidence values is an attribute of the semantic map. That is, the learning module 143 and/or the recognition module 144 may group the same recognition results, calculate an average of confidence values of recognition results in each group, and determine that a recognition result of a group having the highest average confidence value is a final attribute.

Figure 8:
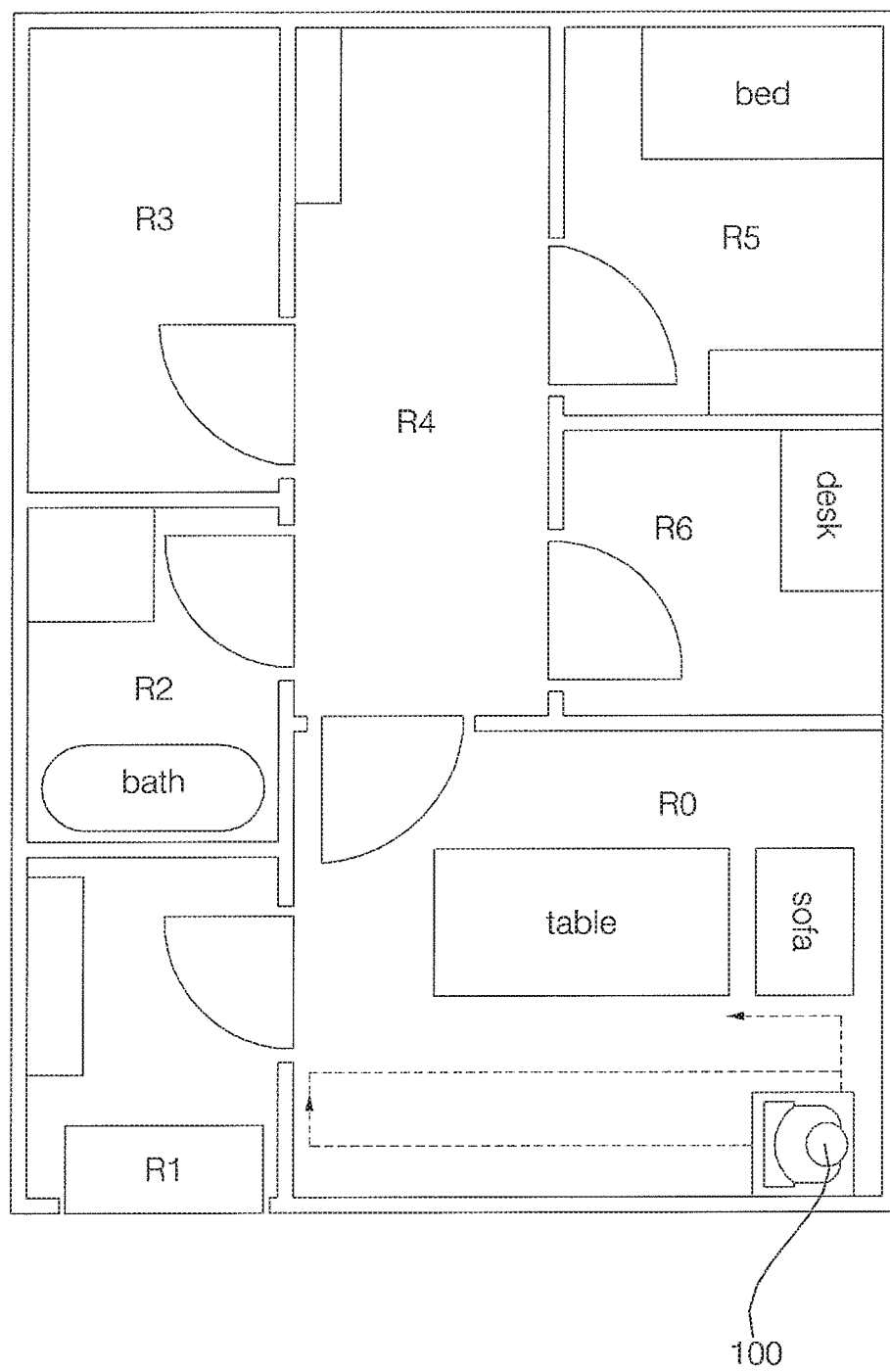
FIGS. 8 to 11 are diagrams illustrating a control method of a moving robot according to an embodiment of the present disclosure.

FIGS. 8 to 11 are diagrams illustrating a control method of a moving robot according to an embodiment of the present disclosure. Referring to FIG. 8, the moving robot 100 according to an embodiment of the present disclosure may perform cleaning while moving in accordance with a command or a setting. For example, the moving robot 100 may move in a zigzag pattern based on a navigation map.

Figure 9:
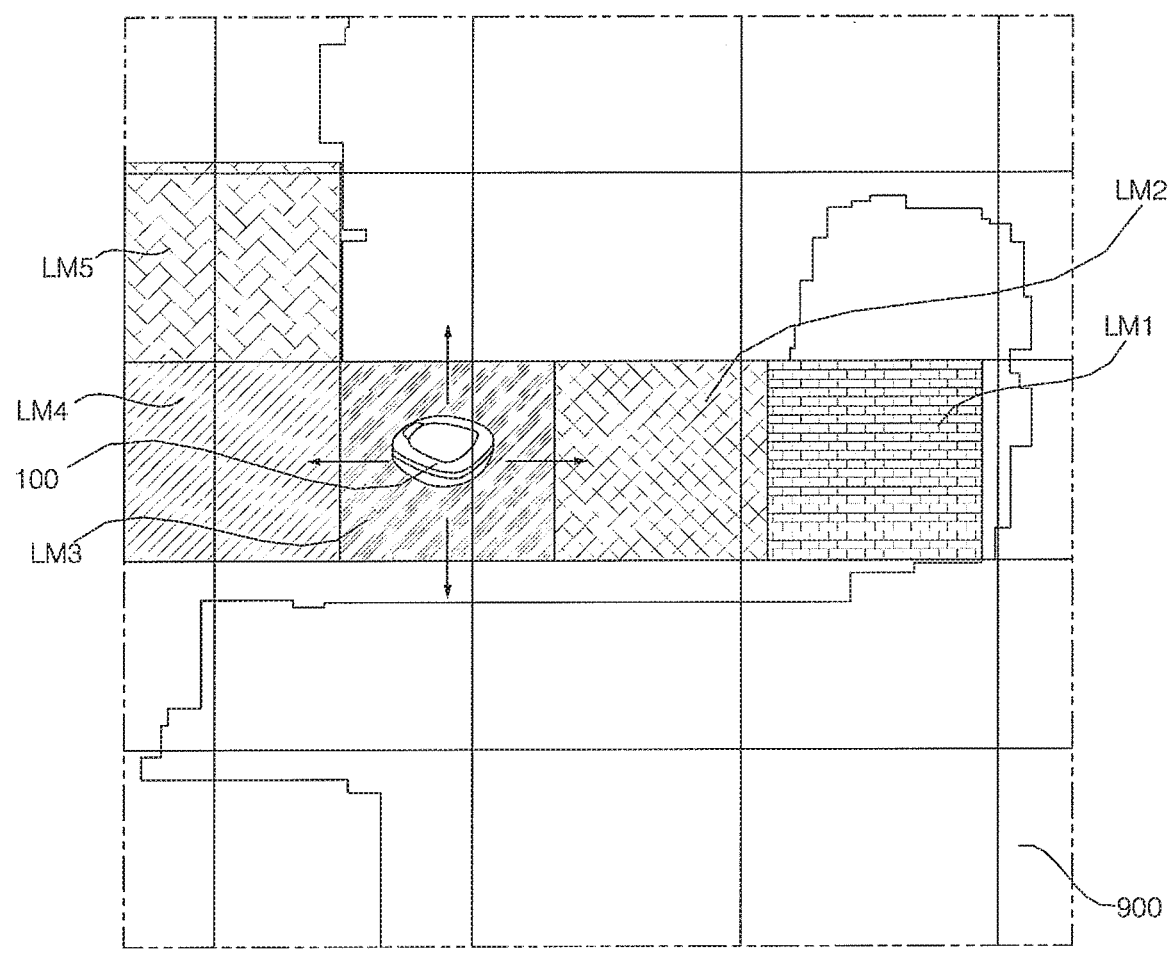

Referring to FIG. 9, a navigation map 900 may include a plurality of local maps LM1, LM2, LM3, LM4, LM5, . . . . The navigation map 900 is segmented into a plurality of regions, and each region may include one or more local maps. Each local map is set not to overlap one another.

Each of the local maps LM1, LM2, LM3, LM4, and LM5 is a kind of a unit map and may be set in a random size. For example, each of the local maps LM1, LM2, LM3, LM4, and LM5 may be set in the shape of a N-by-N square relative to a wall.

In addition, during movement, the moving robot 100 may acquire region information which is based on information on continuous images and map information. The moving robot 100 may move while performing cleaning at home, and may acquire a plurality of images by capturing images while moving.

In this case, the controller 140 may control the image acquisition unit 120 not to additionally perform photographing in a region corresponding to a local map in which an N number of images photographed in multiple directions is acquired. Accordingly, when data sets as many as necessary for attribute recognition is secured, no more images is acquired so as to prevent unnecessary calculation, processing, and recognition. For example, the controller 140 may the controller 140 may control the image acquisition unit 120 to acquire images for each local map in 4 or 8 directions, and, if all images are acquired, the controller 140 may control the image acquisition unit 120 not to acquire additional images.

Meanwhile, at a time of acquiring images, a location of the moving robot 100 is insignificant, but a direction thereof is important. A camera provided in the image acquisition unit 120 may photograph a region of a predetermined range according to a viewing angle. Thus, images even photographed at multiple locations, not at the same location, in a predetermined range at different angles may cover a range of almost 360° which is available when a camera photographs while turning at a particular location. By analyzing the photographed images, it is possible to accurately recognize an attribute of the corresponding region.

Meanwhile, as a plurality of images is photographed, the controller 140 may determine whether a region is recognizable. The controller 140 may recognize a region corresponding to the local map based on the N number of images acquired from the local map.

In addition, the controller 140 may extract an image corresponding to an object from the N number of images acquired in the local map. Based on the extracted image, the controller 140 may recognize the object existing in a region corresponding to the local map.

Meanwhile, the controller 140 may recognize an attribute of a particular region based on data which is pre-learned on the entire region through machine learning. In addition, the controller 140 may recognize an object based on data which is pre-learned on at least part of an image through machine learning.

Figure 10:
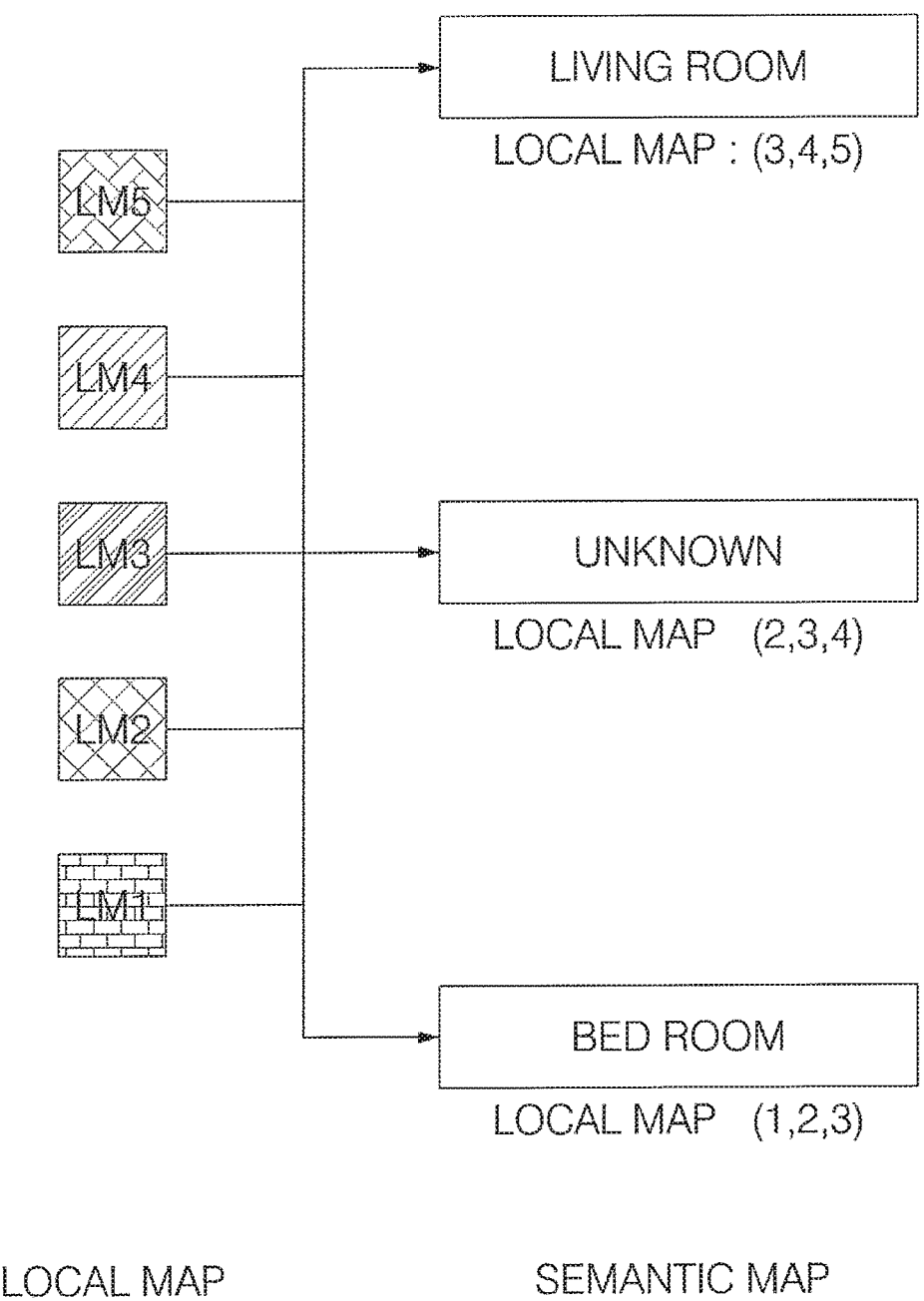
Figure 11:
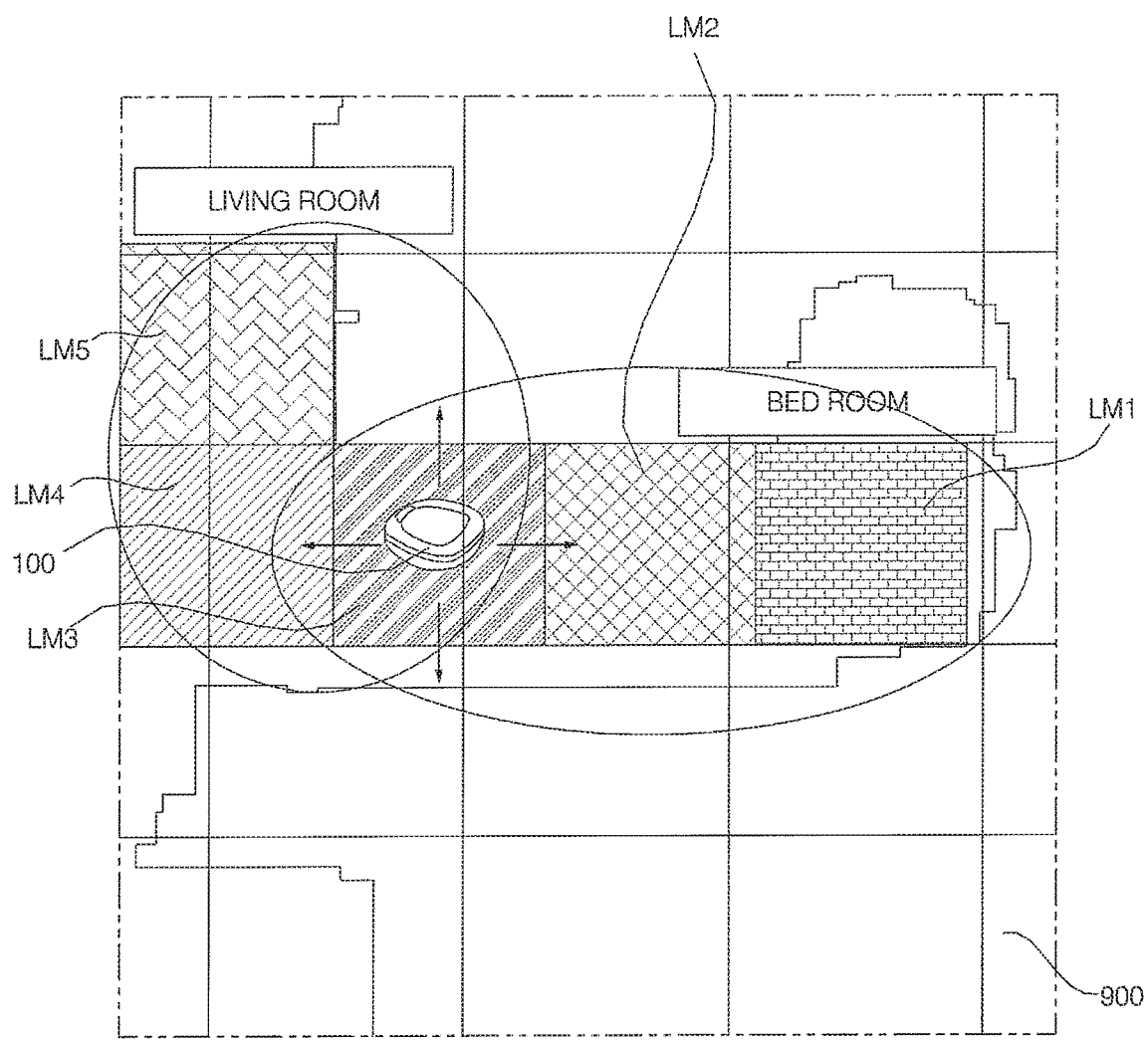

The controller 140 may achieve a final result by merging an object recognition result and a region recognition result of each local map, and may construct a hierarchical map including a plurality of semantic maps, as shown in FIGS. 10 and 11. Referring to FIGS. 10 and 11, if an M number of local maps are continuously gathered, the controller 140 may gradually generate a semantic map. In this case, semantic maps may overlap at boundaries, which is not a problem.

For example, the controller 140 may construct: a semantic map with a first local map LM1, a second local map LM2, and a third local map LM3; a semantic map with the second local map LM2, the third local map LM3, and a fourth local map LM4; and a semantic map with the third local map LM3, the fourth local map LM4, and a fifth local map LM5. The controller 140 may determine a final attribute of a region corresponding to the semantic map based on at least one of frequencies, confidence values, or average confidence values of a plurality of recognition results of the local maps.

For example, regarding the semantic map composed of the first local map LM1, the second local map LM2, and the third local map LM3, the controller 140 may determine that an attribute of a region corresponding to the semantic map is a bed room, based on at least one of frequencies, confidence values, or average confidence values of the plurality of recognition results of the first local map LM1, the second local map LM2, and the third local map LM3.

In addition, regarding the semantic map composed of the third local map LM3, the fourth local map LM4, and the fifth local map LM5, the controller 140 may determine that an attribute of a region corresponding to the semantic map is a living room, based on at least one of frequencies, confidence values, or average confidence values of the plurality of recognition results of the third local map LM3, the fourth local map LM4, and the fifth local map LM5. In addition, regarding the semantic map composed of the second local map LM2, the third local map LM3, and the fourth local map LM4, if a confidence value is smaller than a predetermined threshold, the controller 140 may determine that an attribute of a region corresponding to the semantic map is unknown.

Figure 12:
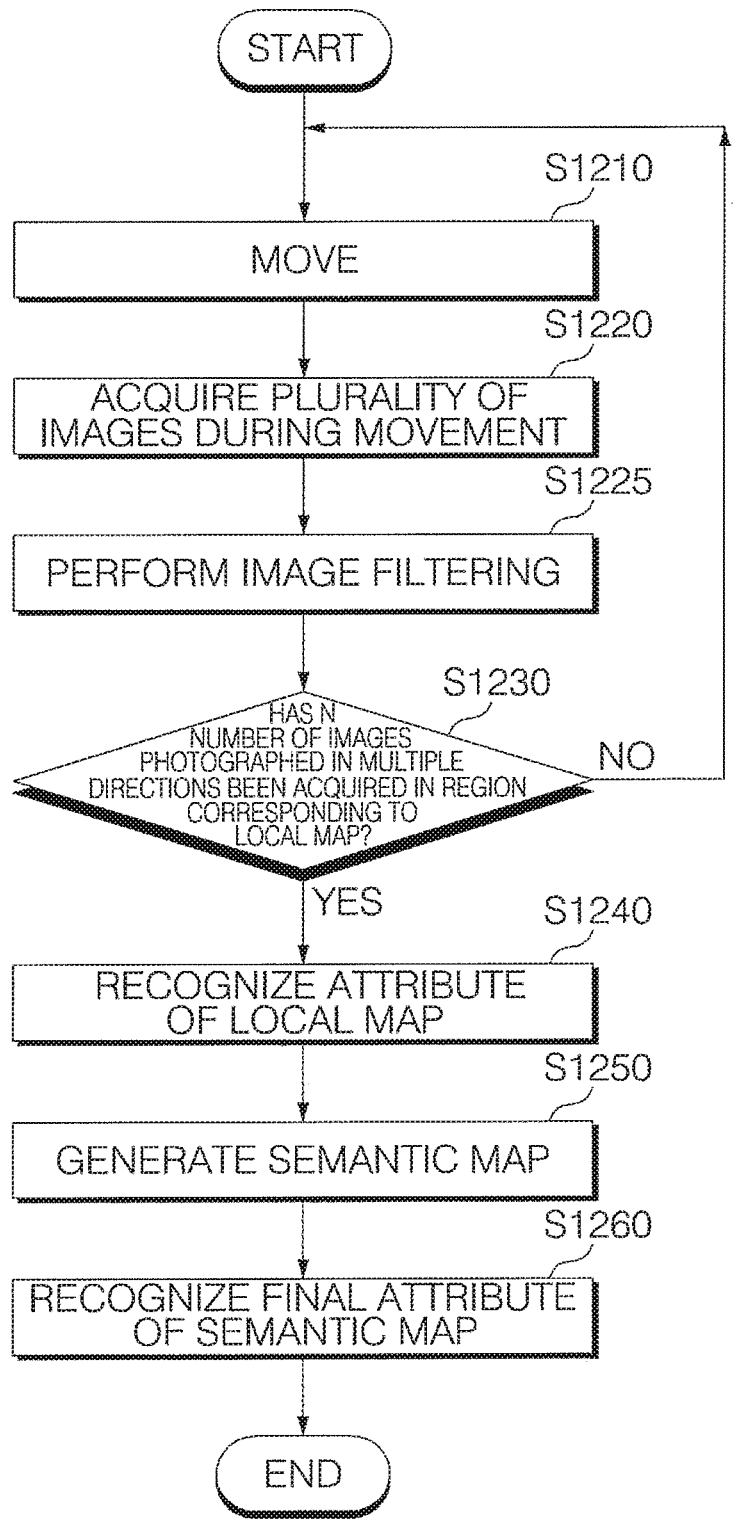
FIG. 12 is a flowchart illustrating a control method of a moving robot according to an embodiment of the present disclosure.

FIG. 12 is a flowchart illustrating a control method of a moving robot according to an embodiment of the present disclosure. Referring to FIG. 12, the moving robot 100 may move based on a navigation map in S1210. The navigation map may include a plurality of local maps. The navigation map is segmented into a plurality of regions, and each region may include one or more local maps. Each local map is set not to overlap each other.

During movement, the moving robot 100 may acquire a plurality of images in regions corresponding to the plurality of local maps through the image acquisition unit 120 in S1220. During movement, the image acquisition unit 120 may acquire images of the surroundings of the main body 110 through a front camera 120a provided to acquire an image of an area in front of the main body 110, and through an upper camera 120b provided on the upper surface of the main body 110.

Meanwhile, the controller 140 may control the image acquisition unit 120 not to additionally perform photographing in a region corresponding to a local map in which an N number of images photographed in multiple directions is acquired. If data sets as many as necessary for attribute recognition is secured, no more image is acquired so as to prevent unnecessary calculation, processing, and recognition.

In addition, the controller 140 may filter some images out of a plurality of images, acquired by the image acquisition unit 120, by a predetermined standard in S1225. For example, the predetermined standard may include whether the sensor unit 170 has sensed an obstacle. In addition, the predetermined standard may further include whether the moving robot 100 is located within a particular region, and whether a pose (or a direction) of the moving robot 100 is toward the center of the particular region. That is, only images which are left after filtering of images inappropriate for recognizing an attribute of the particular region may be used for attribute recognition.

During movement, the moving robot 100 may keep capturing images by a predetermined standard through the image acquisition unit 120. If the number of images photographed in a region corresponding to a particular local map becomes equal to or greater than a predetermined reference number in S1230, the controller 140 may recognize attributes of the corresponding region in S1240.

The controller 140 may recognize an attribute of a local map, in which an N number of images photographed in multiple directions is acquired, among the plurality of local maps, in S1240. For example, the reference number N may be set to be 4, 5, or 16 corresponding to 4 directions (North, East, South, West), 8 directions, or 16 directions.

Meanwhile, the controller 140 may perform control to store the plurality of images in the storage unit 150 in association with location information, direction information, following line information, and local map information which correspond to a time of acquiring the plurality of images. If a plurality of images photographed in multiple directions, for example, 4 (North, East, South, West), 8, or 16 directions, is acquired in a region corresponding to a particular local map in S1230, the controller 140 may recognize an attribute of the local map using the images photographed in the multiple directions in S1240.

In addition, the controller 140 may perform control to store the attribute recognition result of the local map in the storage unit 150. By using all or some of the N number of the images photographed in the multiple directions as input data, the controller 140 may perform attribute recognition based on machine learning and output results thereof.

Meanwhile, the controller 140 may generate a semantic map composed of a predetermined number of neighboring local maps among the plurality of local maps in S1250. Based on attribute recognition results of the local maps included in the semantic map, the controller 140 may recognize a final attribute of a region corresponding to the semantic map in S1260. The controller 140 may recognize attributes of a region corresponding to a local map and a semantic map based on data which is pre-learned through machine learning.

Figure 13:
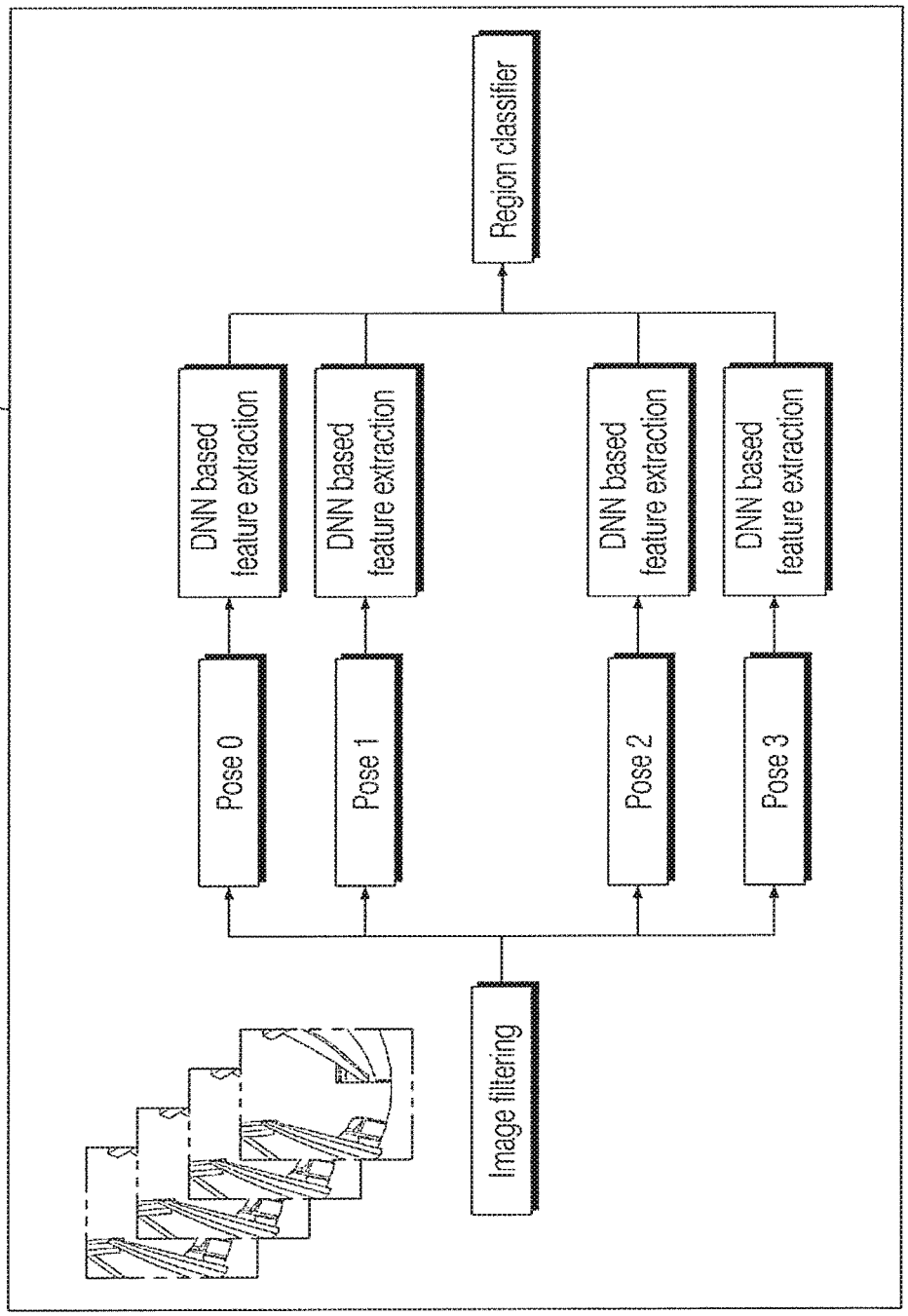
FIG. 13 is a diagram for explanation of region attribute recognition according to an embodiment of the present disclosure.

FIG. 13 is a diagram for explanation of region attribute recognition according to an embodiment of the present disclosure. The moving robot 100 according to an embodiment of the present disclosure may identify an attribute of a place (region recognition) by analyzing features of images photographed in multiple directions in the place, such as a home.

Referring to FIG. 13, while the moving robot 100 moves, the image acquisition unit 120 may acquire a plurality of images photographed at each pose of the moving robot 100 in a particular region. For example, in the case where acquiring images in four directions is set, the image acquisition unit 120 may acquire one image at a 0 to 90 degree pose (Pose 0), one image at a 90 to 180 degree pose (Pose 1), one image at a 180 to 270 degree pose (Pose 2), and one image at a 270 to 360 degree pose (Pose 3).

Referring to FIG. 13, the controller 140 of the moving robot 100 according to an embodiment of the present disclosure may perform filtering on image data, acquired by the image acquisition unit 120, by various standards which take into account sensing data, coordinate information, etc. For example, the controller 140 may remove some of acquired images by a predetermined standard which is, for example, whether the moving robot 100 is located within a region, whether a direction of the moving robot 100 is toward the center of the region, and whether no obstacle exists in front of the moving robot 100.

In addition, as described above with reference to FIG. 5, the controller 140 may extract Deep learning-based image features from a plurality of images which is left after the filtering process (DNN based feature extraction). The controller 140 may analyze an attribute of a corresponding region using the extracted features. For example, the controller 140 may determine that the attribute of the corresponding region is any one of a living room, a bed room, a den, a closet room, a kitchen, a bath room, a corridor, and an unknown space.

The controller 140 according to an embodiment of the present disclosure may include a deep learning-based region classifier. A trained region classifier may classify input data and recognize attributes of a region and an object.

Deep learning is an artificial intelligence technology for training a computer to learn human thinking based on an ANN for constructing artificial intelligence, so that the computer is capable of learning on its own without a person's instruction. The ANN may be implemented in a software form or may be implemented in a hardware form, such as a chip.

The controller 140, for example, the learning module 143 and/or the recognition module 144 may include an ANN which has learned attribute of regions, and which is in a software or hardware form. For example, the learning module 143 and/or the recognition module 144 may include a DNN which is trained through deep learning, for example, a CNN, an RNN, a DBN, etc.

The learning module 143 and/or the recognition module 144 may determine an attribute of a region included in image data that is input based on weights between nodes included in the DNN. Meanwhile, the storage unit 150 may store input data for attribute determination, and data for training the DNN.

The storage unit 150 may store an original image acquired by the image acquisition unit 120, and extracted images in which a particular region is extracted. In addition, in some implementations, the storage unit 150 may store weights and biases of the DNN. Alternatively, in some implementations, weights and biases of the DNN may be stored in an embedded memory of the controller 140.

The controller 140 capable of deep learning-based image recognition may analyze a plurality of images and determine that an attribute of a corresponding region is any one of a living room, a bed room, a den, a closet room, a kitchen, a bath room, a corridor, and an unknown space.

The moving robot 100 according to an embodiment of the present disclosure may recognize attributes of a plurality of regions included in a map. Then, the moving robot 100 may transmit the map and the attribute recognition results to a server, an external terminal, etc. through the communication unit 190, or may transmit a map, in which the attribute recognition results are registered, to a server, an external terminal, etc. In this case, in order to allow a user to easily recognize a region, the moving robot 100 may transmit, to a terminal, data using which a user map where regions are simplified as in section (c) of FIG. 6 is able to be displayed.

Figure 14:
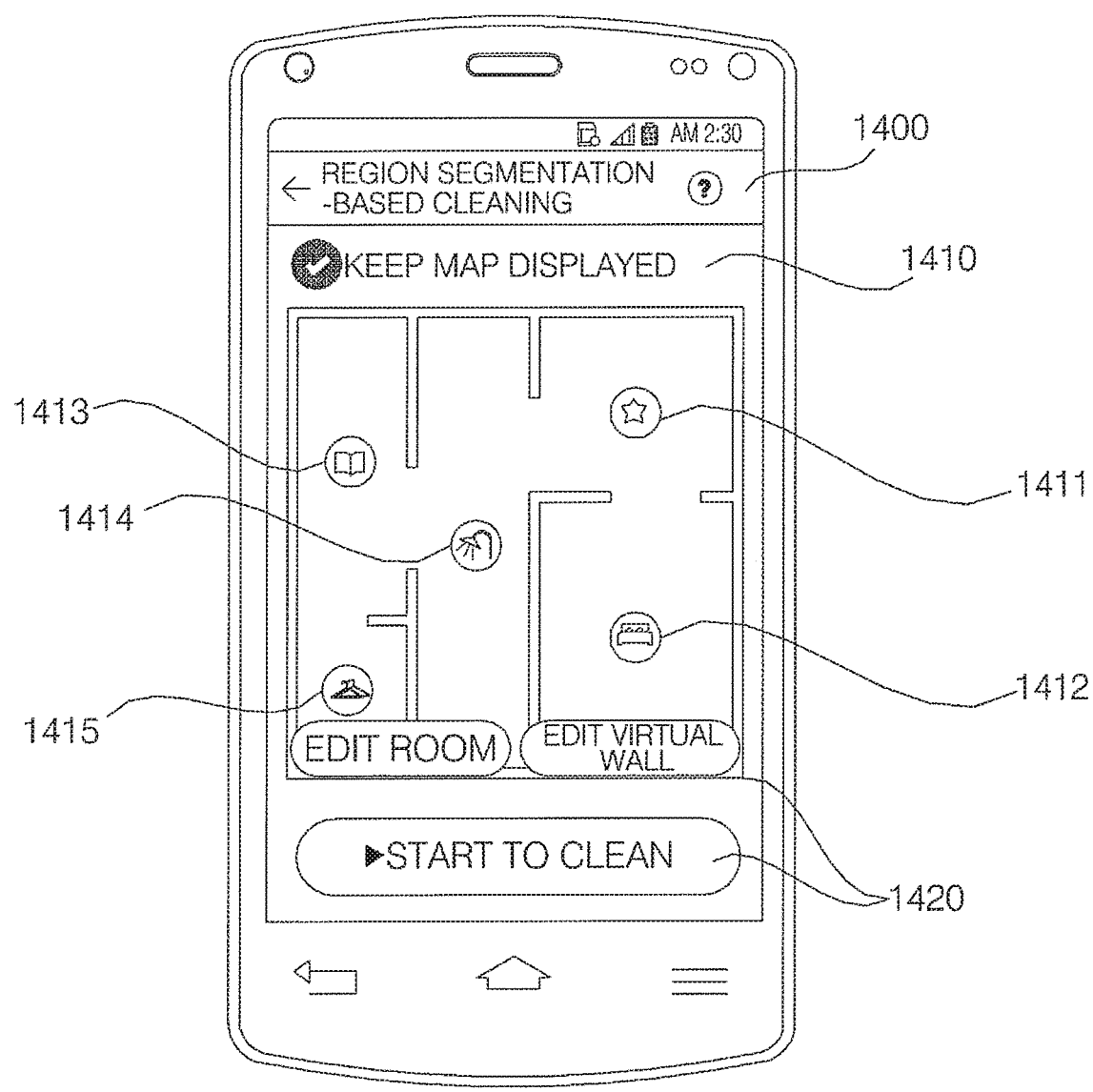
FIG. 14 is a diagram illustrating a user interface according to an embodiment of the present disclosure.

FIG. 14 is a diagram illustrating a user interface according to an embodiment of the present disclosure. Referring to FIG. 14, a display of a user terminal may display a user interface 1400 capable of controlling the moving robot 100. FIG. 14 illustrates an example of the user interface 1400 corresponding to a region segmentation-based cleaning item.

Referring to FIG. 14, the user interface 1400 may include a simplified map 1410, and a user manipulation menu 1420. In this case, in each region of the map 1410, icons 1411, 1412, 1413, 1414, and 1415 indicating identified attributes of regions, such as a living room, a bed room, a bath room, a den, and a closet room, may be displayed.

Figure 15:
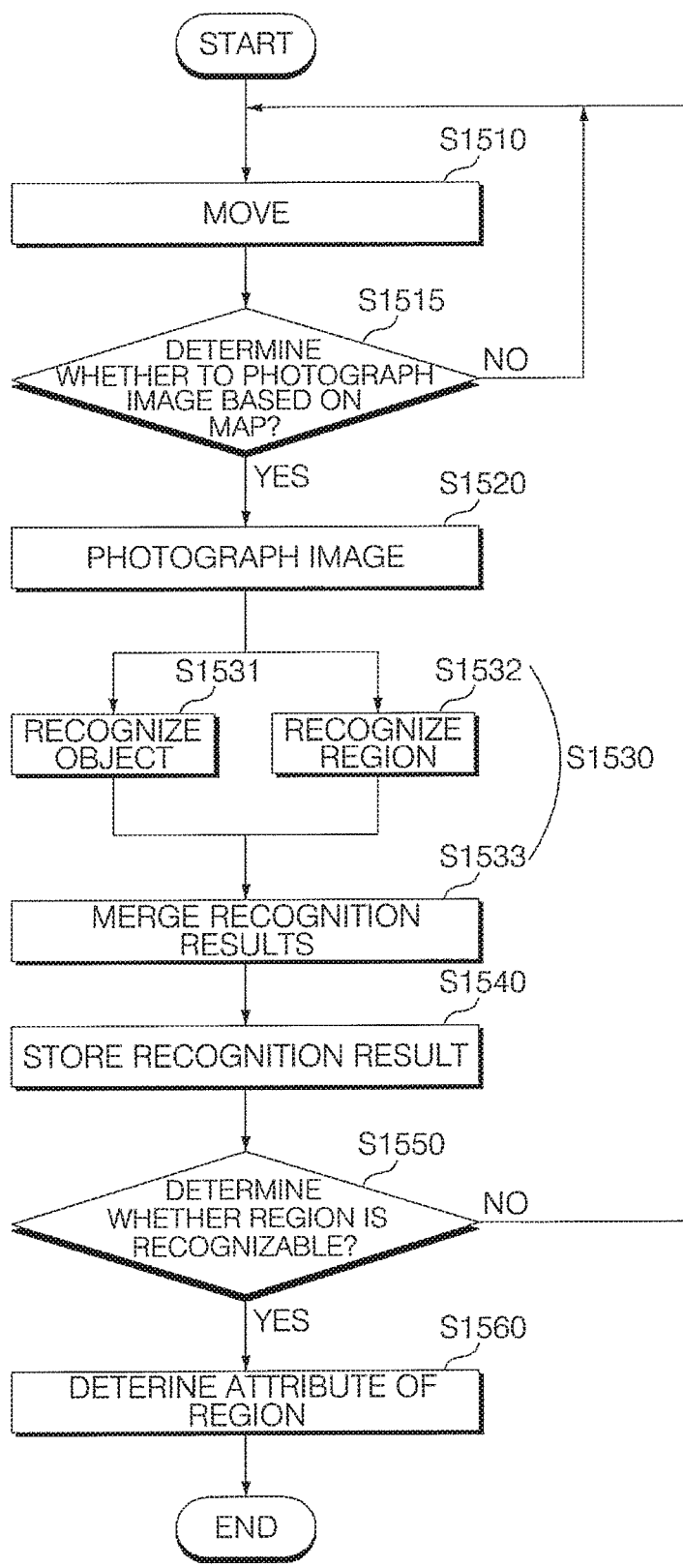
FIG. 15 is a flowchart illustrating a control method of a moving robot according to an embodiment of the preset disclosure.

FIG. 15 is a flowchart illustrating a control method of a moving robot according to an embodiment of the preset disclosure. Referring to FIG. 15, the moving robot 100 may move based on a navigation map in S1510. The navigation map may include a plurality of local maps. The navigation map may be segmented into a plurality of regions, and each region may include one or more local maps. Each local map may be set not to overlap one another.

The controller 140 may determine whether to photograph by a map-based predetermined standard in S1515. For example, the controller 140 may control the image acquisition unit 120 not to additionally perform photographing in a region corresponding to a local map in which an N number of images photographed in multiple directions is acquired. If data sets as many as the number necessary for attribute recognition is secured, no more image is acquired and thus it is possible to prevent unnecessary calculation, processing, and recognition.

In addition, the predetermined standard may include whether the sensor unit 170 has sensed an obstacle, and may further include whether the moving robot 100 is located within a particular region and whether a pose (a direction) of the moving robot 100 is toward the center of the particular region. That is, by controlling the image acquisition unit 140 not to photograph by the predetermined standard, the controller 140 may prevent use of data that may degrade accuracy of attribute recognition.

During movement, the moving robot 100 acquire a plurality of images from regions corresponding to the plurality of local maps through the image acquisition unit 120 in S1520. During movement, the image acquisition unit 120 may acquire images of the surroundings of the main body 110 through a front camera 120a provided to acquire an image of an area in front of the main body 110, and through an upper camera 120b provided on an upper surface of the main body 110.

The controller 140 may recognize an attribute of a local map using an image acquired by the image acquisition unit 120 in S1530. After extracting a partial region from the image, the controller 140 may recognize an object based on data which is pre-learned through machine learning in S1531.

In addition, in S1532, the controller 140 may recognize an attribute of a particular region based on data which is pre-learned on the entire image through machine learning. In addition, the controller 140 may generate a final recognition result of the local map in S1533 by merging a region recognition result and an object recognition result corresponding to the local map.

Meanwhile, the controller 140 may perform control to store the final recognition result of the local map in the storage unit 150 in S1540. Next, as recognition results of local maps are stored, the controller 140 may determine whether a region is recognizable in S1550.

If an M number (e.g., three) of local maps are continuously gathered, the controller 140 may gradually generate a semantic map. As described above with reference to FIGS. 10 and 11, the controller 140 may achieve a final result by merging an object recognition result and a region recognition result of each local map, and construct a hierarchical map including a plurality of semantic maps.

If a sufficient number of recognition results of local maps included in a particular semantic map is gathered in S1550, the controller 140 may determine an attribute of a corresponding region in S1560 by taking into consideration a plurality of recognition results of the local maps. The controller 140 may determine a final attribute of a region corresponding to the corresponding region based on at least one of frequencies, confidence values, or average confidence values of the recognition results.

FIGS. 16-21, 22A-22D, and 23 are diagrams for explaining a control method of a moving robot according to an embodiment of the present disclosure. Conventionally, there were limited region recognition techniques, for example, setting a region by attaching a marker having a particular pattern. In this case, time a customer needs to attach or detach an additional marker each time and set a name for each region.

However, according to the present disclosure, it is possible to identify an attribute of a region using a camera of the moving robot 100, and generate a traveling pattern appropriate for the region. In addition, it is possible to provide user experience (UX) which is able to designate a location for each region or instruct a predetermined function for each region. For example, it is possible to make a command which is used by a user on a daily basis, for example, "Go to the living room and clean it", according to an attribute of a region.

Figure 16:
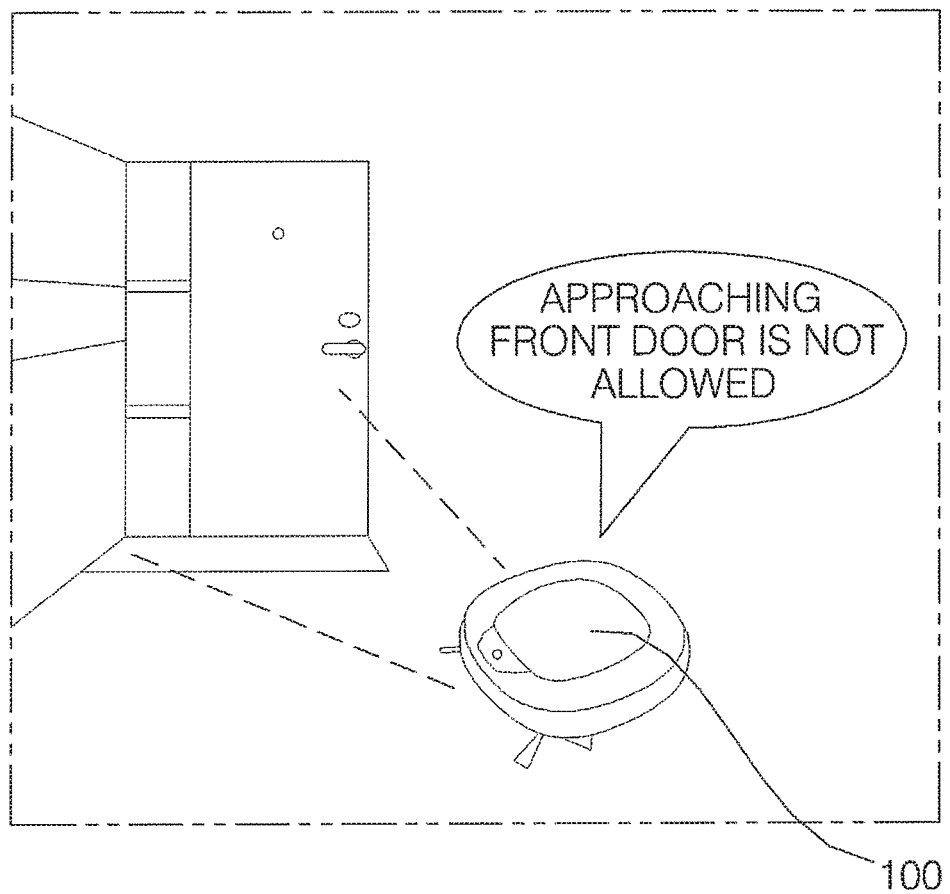

In addition, the moving robot 100 may figure out a context of a place and carry out an appropriate action scenario according to an attribute of the place. Referring to FIG. 16, a virtual wall may be generated with respect to a front door. For example, if the virtual wall is set with respect to the front door, it is possible to prevent the moving robot 100 from traveling toward the front door and deviating from the front door.

Figure 17:
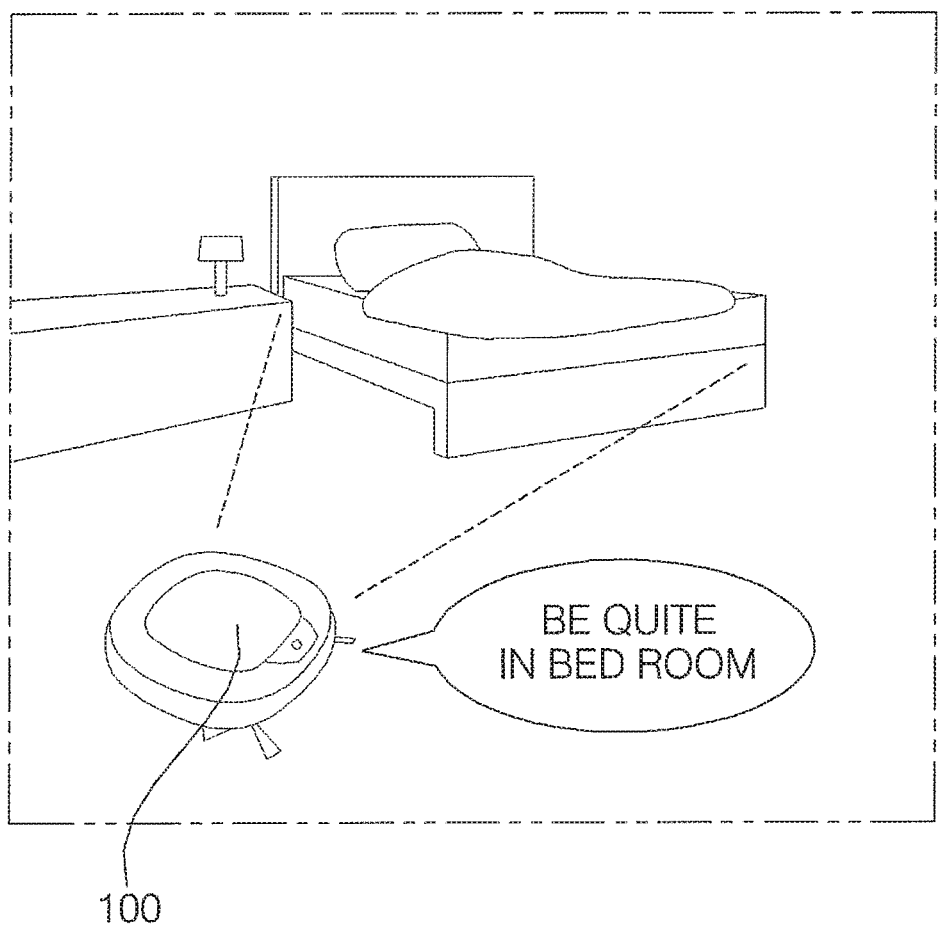

In addition, referring to FIG. 17, by adjusting cleaning output according to a region recognition result of the moving robot 100, it is possible to perform traveling and cleaning optimized for a user's living space. In some implementations, it is possible to recognize an attribute of a region using an N number of images, which the moving robot 100 photographs while turning at a particular location.

However, it is inefficient for the moving robot 100 to turn at multiple locations in the entire travel area in order to acquire images for attribute recognition. In addition, as it is hard for a user to understand that the moving robot 100 repeatedly stops and turns in its place, it may downgrade product reliability.

Thus, it is more desirable to acquire images for attribute recognition during normal traveling for cleaning. For example, while the moving robot 100 travels in a zigzag pattern, the image acquisition unit 120 may continuously acquire images, and the controller 140 may perform control to classify the acquired images based on photographing locations to thereby secure an N number of data sets for a region corresponding to a particular local map.

Referring to FIG. 18, under the control of the controller 140, the travel unit 160 may move the main body 110 in a pattern which is a combination of a first round travel (a) indicative of traveling in a zigzag pattern that predominantly extends in a first direction (e.g., east-west) and a second round travel (b) indicative of traveling in a zigzag pattern that predominantly extends in a second direction (e.g., north south). The first direction may be orthogonal to the second direction. That is, in a region recognition mode, images may be acquired while whole cleaning is performed two times in total.

Meanwhile, it is not necessary to perform the whole cleaning two times in a continuous manner. That is, the first round travel (a) may be carried out in the entire travel area to perform cleaning and acquire an image, and, in the next time, the second round travel (b) may be carried out in the entire travel area to perform cleaning and acquire an image.

In this case, the N number of images photographed in multiple directions may include an image acquired in the first round travel and an image acquired in the second round travel. That is, the controller 140 may perform control to travel in zigzag patterns in multiple directions and secure an N number of data sets in a region corresponding to a particular local map by classifying images, which are acquired during the zigzag traveling in the multiple directions, according to locations.

Accordingly, it is possible to secure enough amount of data necessary for region attribute recognition without using a new traveling pattern which greatly damages the existing travel pattern. When returning back, the moving robot 100 may photograph images in a similar region.

Figure 19:
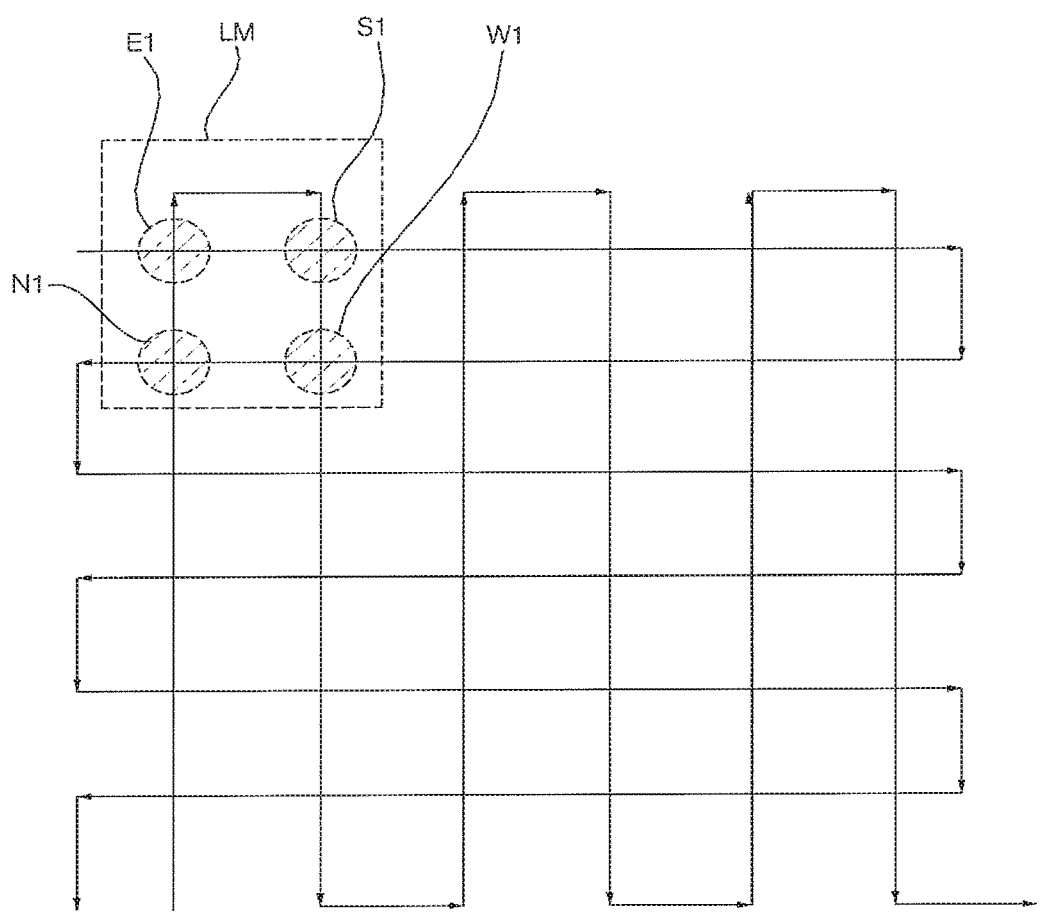

Referring to FIG. 19, while carrying out the first round travel in a particular local map LM, the moving robot 100 may acquire an image at a location E1 toward East and an image at a location W1 toward West. In addition, while carrying out the second round travel in the local map LM, the moving robot 100 may acquire an image at a location N1 toward North and at a location S1 toward South.

Figure 20:
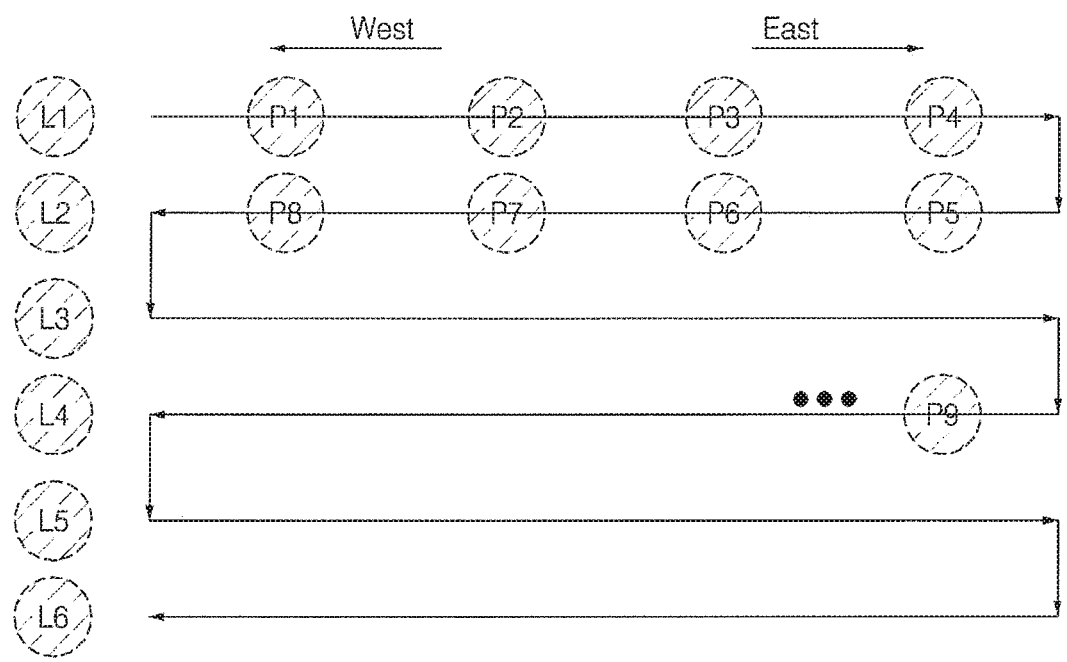

Thus, if a traveling pattern is changed without causing damage to the existing cleaning pattern, it is possible to acquire data regarding four directions. Referring to FIG. 20, the controller 140 may photograph images at predetermined intervals during first round zig-zag traveling, and construct a map for region recognition.

Referring to (a) of FIG. 21, minimum unit information of the map for region recognition may include an X coordinate of the moving robot 100, an Y coordinate of the moving robot 100, direction information of the moving robot 100, following line information (a following line number) of the moving robot 100, whether photographing is performed (occupancy), local map information (local map number), and image data. The direction information may be stored in the form of a numeric value set to correspond to direction information such as North, East, South, and West.

Referring to FIGS. 20 and 21, the controller 140 may define an initial following line when starting to travel, and may perform control to photograph images at predetermined intervals. For example, when photographing is performed at a first location P1 in the first round travel, acquired image data may be stored in the form of (Rx1, Ry1, 0, 1, True, 1, Image), as in (b) of FIG. 21. In this case, "Rx1" and "Ry1" are coordinate information of the first location P1, "0" indicates information on a direction towards the east, "1" indicates a first following line L1, "True" indicates that an image is photographed, and the next "1" indicates a corresponding local map.

Next, the moving robot 100 may photograph images at predetermined intervals while moving. For example, when photographing is performed at a fourth location P4 in the first round travel, acquired image data may be stored in the form of (Rx4, Ry4, 0, 1, True, 4, Image), as in (c) of FIG. 21. In this case, "Rx4" and "Ry4" indicate coordinate information of the fourth location P4, "0" indicates information on a direction towards the east, "1" indicates a first following line L1, "True" indicates that an image is photographed, and the next "4" indicates a corresponding local map.

Meanwhile, the controller 140 may define a new following line L2 when the existing following line is changed due to turning. The controller 140 may perform control to photograph at coordinates along the current following line L2, the coordinates which correspond to coordinates at which photographing was performed along the previous following line L1.

In this case, while traveling in the new following line L2, the controller 140 may check whether there are data photographed in a neighboring following line L1 and data which could be paired therewith. If there is no data which could be paired, the controller 140 may photograph an image at a location P5 which corresponds to the location P4 at which photographing was performed in the neighboring following line L1. If there are two data sets paired with each other in two neighboring following lines L1 and L2 included in a predetermined local map, photographing is not performed in the current following line L2.

Figure 22A:
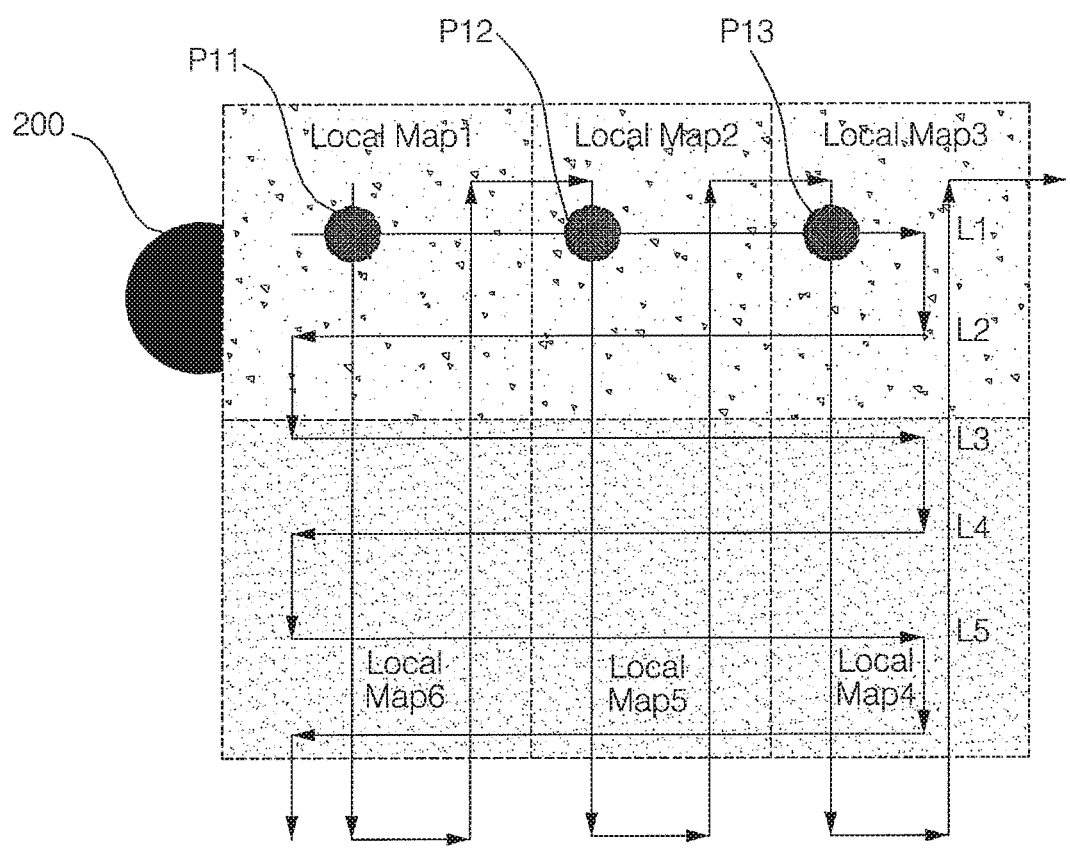

Referring to FIG. 22A, the moving robot 100 may define an initial following line L1 when leaving the charging station 200. While traveling along the initial following line L1, the moving robot 100 may move a predetermined distance and then photograph an image. Again, the moving robot 100 moves straight forward the predetermined distance and then check whether the current coordinates of the moving robot 100 is within a local map in which the image is photographed. If the current coordinates of the moving robot 100 is within the local map, the moving robot 100 moves straight forward the predetermined distance again. If the current coordinates of the moving robot 100 is out of the local map, the moving robot 100 photographs an image and then moves. In this manner, the moving robot 100 may photograph images at predetermined intervals between photographing locations P11, P12, and P13, and acquire one image for each local map in a direction toward East.

Figure 22B:
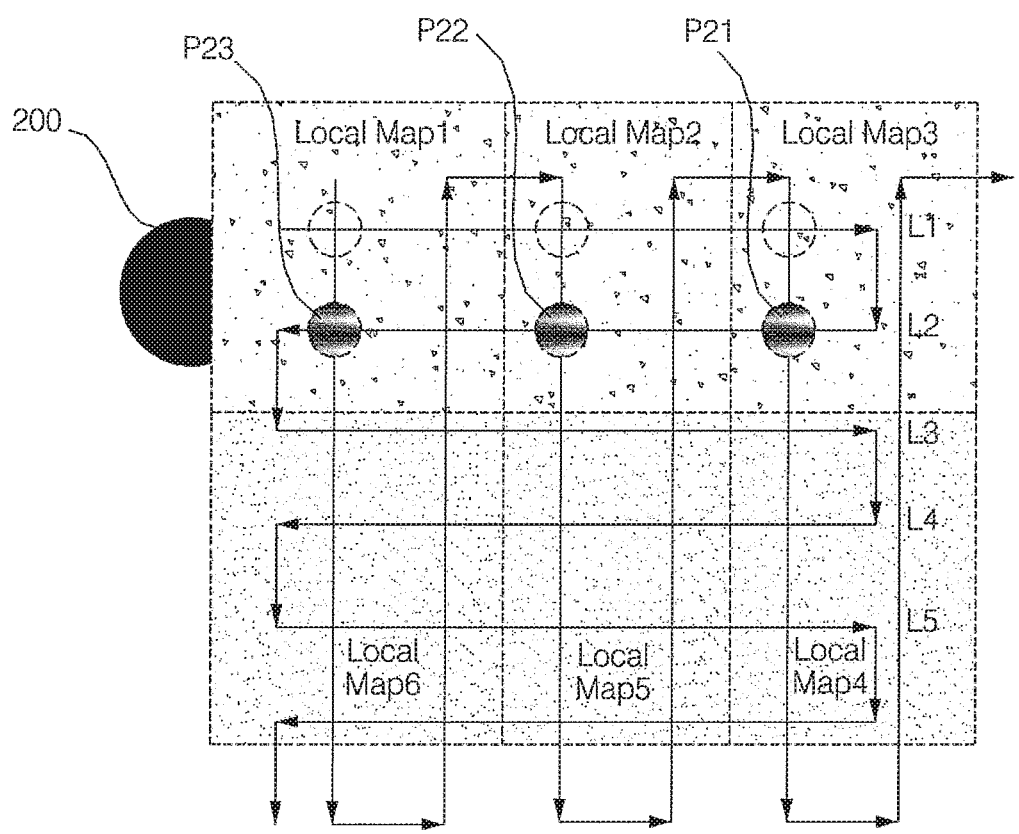

Referring to FIG. 22B, the moving robot 100 may define a second following line L2 after making a turn, and photograph an image after traveling a predetermined distance along the second following line L2. In addition, direction information and following line information which are stored while the moving robot 100 travels along the second following line L2 may be changed.

Meanwhile, a particular location P21 in the second following line L2 is a location paired with a particular location P13 in the first following line L1. Since a data set being paired with a data set acquired at the particular location P13 in the first following line L1 has not been stored, the moving robot 100 performs photographing at the particular location P21 and moves straight forward a predetermined distance in a direction toward West.

In the above manner, photographing is performed at particular locations P21, P22, and P23 in the second following line L2. Meanwhile, the moving robot 100 may define a third following line L3 when making a turn after traveling along the second following line L2, and travel along the third following line L3.

If the third following line L3 leads to traveling in the same local maps 1, 2, and 3 as the previous following lines L1 and L2, a paired data set already exists and therefore the moving robot 100 travels without capturing an image. If the third following line L3 leads to traveling local maps 4, 5, and 6 other than the same local maps 1, 2, 3 of the previous following lines L1 and L2, the moving robot 100 travels while capturing an image.

According to a setting, the moving robot 100 may travel without capturing an image by a predetermined standard even in the case where the third following line L3 leads to traveling in the local maps 4, 5, and 6 other than the same local maps 1, 2, and 3 of the previous following lines L1 and L2. For example, if the third following line L2 extend over the boundaries of local maps, photographing may be skipped in order to acquire an image in a more stable location.

Figure 22C:
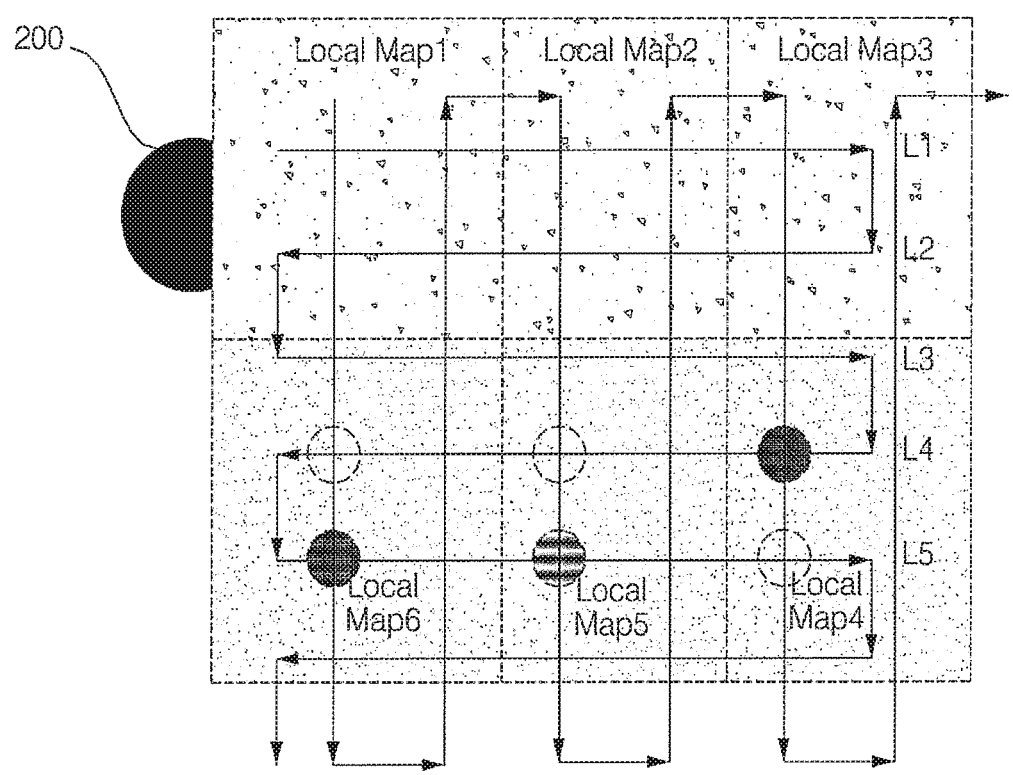

Referring to FIG. 22C, if the third following line L3 is skipped, photographing is performed in a fourth following line L4 and a fifth following line L5. As described above with reference to FIGS. 22A to 22C, images towards the east and the west may be acquired in the first round travel.

Figure 22D:
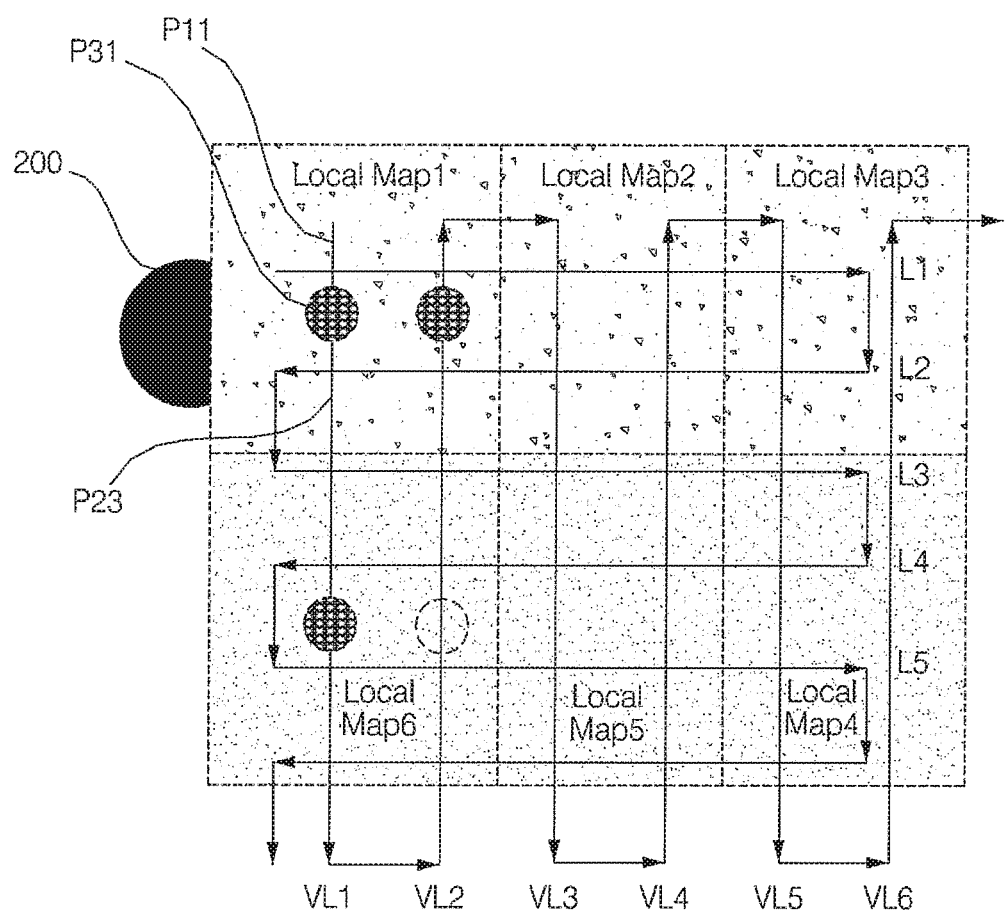

Next, images photographed in directions toward North and South may be acquired in the second travel. Referring to FIG. 22D, in the second round travel, photographing is performed along a first following line VL1 to a sixth following line VL6. Preferably, the second round travel may be set to start photographing from a location P31 between the first photographing location P11 in the first local map and a location P23 being paired with the location P11. Accordingly, a photographing location may be stably located within a predetermined range from a direction toward North/East/South/West.

FIG. 23 shows examples of an attribute recognition result of each local map. Referring to FIG. 23, there are four-direction (E, W, S, N) data sets for each local map, and thus, recognition results and confidence values for the four directions may be generated.

For example, regarding a first local map, an image photographed in the direction toward East may be recognized as a bed room with a confidence value of 0.9, an image photographed in the direction toward West may be recognized as a bed room with a confidence value of 0.7, an image photographed in the direction toward South may be recognized as a bed room with a confidence value of 0.7, and an image photographed in the direction toward North may be recognized as a bed room with a confidence value of 0.9.

Regarding a second local map, an image photographed in the direction toward East may be recognized as a bed room with a confidence value of 0.8, an image photographed in the direction toward West may be recognized as a bed room with a confidence value of 0.6, an image photographed in the direction toward South may be recognized as a bed room with a confidence value of 0.5, and an image photographed in the direction toward North may be recognized as a bed room with a confidence value of 0.9.

Regarding a third local map, an image photographed in the direction toward East may be recognized as a bed room with a confidence value of 0.7, an image photographed in the direction toward West may be recognized as a bed room with a confidence value of 0.5, an image photographed in the direction toward South may be recognized as a bed room with a confidence value of 0.4, and an image photographed in the direction toward North may be recognized as a bed room with a confidence value of 0.5. Based on at least one of frequencies, confidence values, or average confidence values of recognition results of the local maps, the controller 140 may determine a final attribute of a region corresponding to a semantic map.

Referring back to FIGS. 10 and 11, regarding the semantic map composed of the first local map LM1, the second local map LM2, and the third local map LM3, the controller 140 may determine that an attribute of a region corresponding to the semantic map is a bed room, based on at least one of frequencies, confidence values, or average confidence values of the plurality of recognition results of the first local map LM1, the second local map LM2, and the third local map LM3.

According to at least one of the above embodiments of the present disclosure, a moving robot is capable of recognizing attributes of a plurality of regions in a travel area. In addition, according to at least one of the above embodiments of the present disclosure, the moving robot is capable of improving user convenience with using a region attribute recognition result conveniently. In addition, according to at least one of the above embodiments of the present disclosure, the moving robot is capable of accurately recognizing attributes of regions through machine learning.

The moving robot and the control method thereof according to the present disclosure may enable segmenting a travel area into a plurality of regions, easily determining the current location of the moving robot by recognizing attributes of the plurality of regions, receiving a cleaning command for each region, and performing cleaning according to a shape of each region, thereby improving efficiency of moving and cleaning operations.

As for the moving robot according to the present disclosure, the configuration and method according to the embodiments of the present disclosure described above are not limited in its application, but the entirety or a portion of the embodiments may be selectively combined to be configured into various modifications.

Meanwhile, the control method of a moving robot according to an embodiment of the present disclosure may be implemented as code that can be written on a computer-readable medium in which a program is recorded and thus read by a computer. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). since the recording media readable by the processor are distributed to the computers connected by a network, codes readable by the processor can be stored and executed in a manner of being distributed.

Although the exemplary embodiments have been illustrated and described, embodiments are not limited to the above-described particular embodiments, various modifications are possible by those skilled in the art without departing from the scope and spirit as disclosed in the accompanying claims and these modifications should not be understood separately from the scope and spirit.

The present disclosure provides a moving robot capable of recognizing attributes of a plurality of region in a travel area, and a control method thereof. The present disclosure provide a moving robot capable of improving user convenience with using a region attribute recognition result conveniently, and a control method thereof. The present disclosure provides a moving robot capable of accurately recognizing attributes of regions through machine learning, and a control method thereof.

In one general aspect of the present disclosure, the above and other objects can be accomplished by the provision of a moving robot including: a travel unit configured to move a main body based on a navigation map including a plurality of local maps; an image acquisition unit configured to acquire a plurality of images in regions corresponding to the plurality of local maps during movement; a storage unit configured to store the plurality of images acquired by the image acquisition unit; and a controller configured to recognize an attribute of a local map in which an N number of images photographed in multiple directions is acquired among the plurality of local maps, store the attribute recognition result in the storage unit, generate a semantic map composed of a predetermined number of neighboring local maps, and recognize a final attribute of a region corresponding to the semantic map based on attribute recognition results of the local maps included in the semantic map. Accordingly, it is possible to recognize attributes of regions effectively.

In another general aspect of the present disclosure, the above and other objects can be accomplished by the provision of a control method of a moving robot, the method including: moving a main body based on a navigation map including a plurality of local maps; during movement, acquiring, by an image acquisition unit, a plurality of images in regions corresponding to the plurality of local maps; recognizing an attribute of a local map in which an N number of images photographed in multiple directions is acquired among the plurality of local maps; storing the attribute recognition result; generating a semantic map composed of a predetermined number of neighboring local maps among the plurality of local maps; and recognizing a final attribute of a region corresponding to the semantic map based on attribute recognition results of the local maps included in the semantic map.

According to at least one of the embodiments of the present disclosure, a moving robot is capable of recognizing attributes of a plurality of regions in a travel area. In addition, according to at least one of the embodiments of the present disclosure, the moving robot is capable of improving user convenience with using a region attribute recognition result conveniently.

In addition, according to at least one of the embodiments of the present disclosure, the moving robot is capable of accurately recognizing attributes of regions through machine learning. Meanwhile, other effects may be explicitly or implicitly disclosed in the description of the embodiments of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
    a drive wheel configured to move a main body based on a navigation map including a plurality of local maps;
    a camera configured to, during movement of the main body, acquire a plurality of images in regions corresponding to the plurality of local maps;
    a memory configured to store the plurality of images acquired by the camera; and
    a controller configured to:
        recognize an attribute of one of the regions associated with a local map identified from the plurality of local maps, N number of images photographed in multiple directions being acquired by the camera in the region associated with the local map;
        store, in the memory, a recognition result associated with the attribute of the local map;
        generate a semantic map composed of a particular quantity of local maps identified from the plurality of local maps, the local maps included in the semantic map being associated with one or more of the regions neighboring the region associated with the local map; and
        recognize a final attribute of a region corresponding to the semantic map based on attribute recognition results of the local maps included in the semantic map,
    wherein the controller is further configured to:
        recognize the region corresponding to the local map based on the N number of images associated with the local map;
        recognize an object existing in the region corresponding to the local map; and
        merge a region recognition result and an object recognition result corresponding to the local map.

2. The moving robot of claim 1, wherein the controller is further configured to:
    extract an image corresponding to the object from the N number of images associated with the local map, wherein the object is recognized based on the extracted image.

3. The moving robot of claim 1, further comprising a sensor configured to sense an obstacle,
    wherein the controller is further configured to filter one or more images out of the plurality of images captured by the camera based on a predetermined standard, and
    wherein the predetermined standard includes whether the sensor has sensed an obstacle.

4. The moving robot of claim 1, further comprising a sensor configured to sense an obstacle,
    wherein the controller is further configured to determine when to activate the camera to capture an image based on a predetermined standard, and
    wherein the predetermined standard includes whether the sensor has sensed an obstacle.

5. The moving robot of claim 1, wherein the controller is further configured to control the camera to not additionally capture another image in the region, corresponding to the local map, where the N number of images are photographed in the multiple directions.

6. The moving robot of claim 1, wherein the controller is further configured to store, to the memory, the plurality of images in association with location information and direction information for the main body at respective times when the plurality of images are acquired by the camera.

7. The moving robot of claim 1, wherein the N number of images photographed in multiple directions includes one or more images that are captured when the moving robot is turning at a particular location.

8. The moving robot of claim 1, wherein the drive wheel is further configured to move the main body to carry out a first round travel indicative of traveling in a zigzag pattern extending in a first direction and a second round travel indicative of traveling in a zigzag pattern extending in a second direction intersecting the first direction.

9. The moving robot of claim 8, wherein the camera acquires the N number of images in the multiple directions which include an image acquired in the first round travel and another image acquired in the second round travel.

10. The moving robot of claim 1, wherein the controller is further configured to determine the final attribute of the region corresponding to the semantic map based on at least one of frequencies, confidence values, or average confidence values of the attribute recognition results for the local maps included in the semantic map.

11. A control method of a moving robot, the method comprising:
    moving a main body based on a navigation map including a plurality of local maps;
    while the main body is moving, acquiring, by a camera, a plurality of images in regions corresponding to the plurality of local maps;
    recognizing an attribute of a local map, included in the plurality of local maps, associated with one of the regions in which N number of images photographed in multiple directions are acquired;

storing a recognition result associated with the local map;
generating a semantic map composed of a particular quantity of local maps included in the plurality of local maps, the local maps included in the semantic map being associated with one or more of the regions neighboring the region where the N number of images are photographed in multiple directions; and
recognizing a final attribute of a region corresponding to the semantic map based on attribute recognition results for the local maps included in the semantic map,
wherein recognizing the attribute of the local map includes:
  recognizing the region corresponding to the local map based on the N number of images;
  recognizing an object in the region associated with the local map; and
  merging a region recognition result and an object recognition result corresponding to the local map.

12. The moving method of claim 11, wherein recognizing the attribute of the local map further includes:
  extracting an image corresponding to the object from the N number of images associated with the local map, wherein the object is recognized based on the extracted image.

13. The moving method of claim 11, further comprising:
filtering some images out of the plurality of images based on a predetermined standard,
wherein the predetermined standard includes whether an obstacle is sensed.

14. The control method of claim 11, further comprising:
determining, based on a predetermined standard, when to activate the camera to perform photographing,
wherein the predetermined standard includes whether an obstacle is sensed.

15. The control method of claim 11, wherein acquiring the plurality of images includes:
  controlling the camera to not perform additional photographing in the region corresponding to the local map in which the N number of images photographed in the multiple directions are acquired.

16. The control method of claim 11, further comprising:
storing the plurality of images in association with location information, direction information, following line information, and local map information corresponding to times when the plurality of images are acquired.

17. The control method of claim 11, wherein at least one of the N number of images photographed in the multiple directions are acquired while the moving robot is turning at a particular location.

18. The control method of claim 11, wherein moving the main body include:
  moving the main body in a first round travel indicative of traveling in a first zigzag pattern extending substantially in a first direction; and
  moving the main body in a second round travel indicative of traveling in a second zigzag pattern extending substantially in a second direction which is orthogonal to the first direction.

19. The control method of claim 18, wherein the N number of images photographed in the multiple directions comprises an image acquired in the first round travel and another image acquired in the second round travel.

20. The control method of claim 11, wherein recognizing the final attribute of the region corresponding to the semantic map includes:
  determining the final attribute of the region corresponding to the semantic map based on at least one of frequencies, confidence values, or average confidence values of the attribute recognition results for the local maps included in the semantic map.

* * * * *